US008024274B2

(12) United States Patent
Parkes et al.

(10) Patent No.: US 8,024,274 B2
(45) Date of Patent: Sep. 20, 2011

(54) PRACTICAL SECRECY-PRESERVING, VERIFIABLY CORRECT AND TRUSTWORTHY AUCTIONS

(75) Inventors: David C. Parkes, Cambridge, MA (US); Michael O. Rabin, Cambridge, MA (US); Stuart M. Shieber, Brookline, MA (US); Christopher A. Thorpe, Lincoln, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 12/299,522

(22) PCT Filed: May 7, 2007

(86) PCT No.: PCT/US2007/068373
§ 371 (c)(1),
(2), (4) Date: Mar. 18, 2009

(87) PCT Pub. No.: WO2008/048713
PCT Pub. Date: Apr. 24, 2008

(65) Prior Publication Data
US 2009/0182667 A1 Jul. 16, 2009

Related U.S. Application Data

(60) Provisional application No. 60/798,121, filed on May 5, 2006.

(51) Int. Cl.
*G06Q 20/00* (2006.01)
(52) U.S. Cl. ............................. 705/64; 705/26.3; 705/78
(58) Field of Classification Search ......................... None
See application file for complete search history.

(56) References Cited

U.S. PATENT DOCUMENTS

| 6,363,365 | B1 * | 3/2002 | Kou ................................. 705/64 |
| 6,603,857 | B1 | 8/2003 | Batten-Carew |
| 2001/0056394 | A1 * | 12/2001 | Hamada .......................... 705/37 |
| 2003/0055662 | A1 * | 3/2003 | Collins ............................. 705/1 |
| 2003/0074330 | A1 | 4/2003 | Asokan |
| 2003/0198348 | A1 | 10/2003 | Mont |
| 2009/0177591 | A1 | 7/2009 | Thorpe et al. |
| 2009/0327141 | A1 | 12/2009 | Rabin et al. |

(Continued)

FOREIGN PATENT DOCUMENTS
JP 2001 076061 A 3/2001

OTHER PUBLICATIONS

Dreyfus will pay $20.5 million to settle lawsuit. The New York Times, Jun. 22, 2001.

(Continued)

*Primary Examiner* — Calvin L Hewitt, II
*Assistant Examiner* — Tsan-Yu J Huang
(74) *Attorney, Agent, or Firm* — Lando & Anastasi, LLP

(57) ABSTRACT

A system and method for conducting verifiably correct auctions that preserves the secrecy of the bids while providing for verifiable correctness and trustworthiness of the auction is disclosed. Some of the elements of the method and apparatus are that the auction operator accepts all bids submitted and follows the published rules of the auction. In one embodiment, the bids are maintained secret from the auctioneer and all bidders until the auction closes and no bidder is able to change or repudiate her bid. In another embodiment, the auction operator computes the auction results and publishes proofs of the results' correctness. In yet another embodiment, any party can check these proofs of correctness via publicly verifiable computations on encrypted bids.

20 Claims, 8 Drawing Sheets

U.S. PATENT DOCUMENTS

2010/0185863 A1    7/2010    Rabin et al.

OTHER PUBLICATIONS

Settlement reached with five specialist firms for violating Federal securities laws and NYSE regulations. U.S. SEC Press Release, 2004. http://www.sec.gov/news/press/2004-42.htm.
J. Anderson. S.E.C. is looking at stock trading. The New York Times, Feb. 6, 2007.
B. Biais, L. Glosten, and C. Spatt. Market microstructure: a survey of microfoundations, empirical results and policy implications. Journal of Financial Markets, 8(2): 217-264, May 2005.
P. Bogetoft, I. Damgard, T. Jakobsen, K. Nielsen, J. Pagter, and T. Toft. A practical implementation of secure auctions based on multiparty integer computation. In Proc. 10th International Conference on Financial Cryptography and Data Security (FC 2006), 2006.
F. Boudot. Efficient proofs that a committed number lies in an inteval. In Proc. EUROCRYPT '00, pp. 431-444, 2000.
C. Bray, Two ex-Van der Moolen specialists are convicted of securities fraud. The Wall Street Journal, Jul. 15, 2006.
I. Damgard and M. Jurik. A generalisation, a simplification and some applications of Paillier's probabilistic public-key system. In Proceedings of Public Key Cryptography '01, 2001.
G. Di Crescenzo. Privacy for the stock market. Lecture Notes in Computer Science, 2339:269 ff., 2002.
Y. Frandel, Y. Tsiounis, and M. Yung. "Indirect Discourse Proofs": Achieving efficient fair off-line E-cash. In K. Kim, editor, Advances in Cryptology: Proceedings of ASIACRYPT 1996, Kyongju, Korea, No. 1163 in Lecture Notes in Computer Science, Berlin, 1996. Springer Verlag.
G. Gemmill. Transparency and liquidity: A study of block trades on the London Stock Exchange under different publication rules. Journal of Finance, 51:1765-1790, 1994.
L. Harris, Trading and Exchanges. Oxford University Press, 2003.
D.B. Keim and A. Madhavan. The upstairs market for large-block transactions: Analysis and measurement of price effects. Review of Financial Studies, 9:1-36, 1996.
H. Lipmaa, N. Asokan, and V. Niemi. Secure Vickrey auctions without threshold trust. In Proc. 6th International Conference on Financial Cryptography (FC 2002), pp. 87-101, 2002.
A. Madhavan. Market microstructure: A survey. Mar. 8, 2000.
S. Matsuo and H. Morita. Secure protocol to construct electronic trading. IEICE Transactions on Fundamentals of Electronics, Communications, and Computer Sciences, E84-A(1):281-288, 2001.
Cryptographie à Clé Publique Basée sur la Résiduosité de Degré Composite. PhD thesis, École Nationale Supérieure des Télécommunicaitons, 1999.
P. Paillier. Public-key cryptosystems based on composite residuosity classes. In Proc. EUROCRYPT '99, pp. 223-239, 1999.
D.C. Parkes, M.O. Rabin, S.M. Shieber, and C.A. Thorpe. Practical secrecy-preserving, verifiably correct and trustworthy auctions. In ICEC '06: Proceedings of the 8th international conference on Electronic commerce, pp. 70-81, New York, NY, USA, 2006. ACM Press.
B. Rindi. Transparency, liquidity and price formation. In Proceedings of the 57th European Meeting of the Econometric Society, 2002.
H.R. Stoll. Market microstructure. In G.M. Constantinides, M. Harris, and R. Stulz, editors, Handbook of the Economics of Finance. Elsevier Science B.V., 2003.
M. Szydlo. Risk assurance for hedge funds using zero knowledge proofs, In Proc. 9th International Conference on Financial Cryptography and Date Security (FC 2005), 2005.
C. Wang, H. Leung, and Y. Wang. Secure double auction protocols with full privacy protection. In formation Security and Cryptography—ICISC 2003: 6th International Conference, 2003.
M. Yokoo and K. Suzuki. Secure multiagent dynamic programming based on homomorphic encryption and its application to combinatorial auctions. In Proc. First Int. Conf. on Autonomous Agents and Multiagent Systems, 2002.
J. Baek, R. Safavi-Naini, and W. Susilo. Token-controlled public key encryption. In R.H. Deng, F. Beo, H. Pang, and J. Zhou, editors, Proceedings of ISPEC 2005, vol. 3439 of Lecuture Notes in Computer Science, pp. 386-397. Springer Verlag, 2005.
M. Bellare and S. Goldwasser. Verifiable partial key escrow. In ACM Conference on Computer and Communications Security, pp. 78-91, 1997.
I.F. Blake and A.C.-F. Chan. Scalable, server-passive, user-anonymous timed release public key encryption from bilinear pairing, Sep. 7, 2004.
D. Boneh and M.K. Franklin. Efficient generation of shared RSA keys. In advances in Cryptology—CRYPTO, vol. 1294 of Lecture Notes in Computer Science, pp. 425-439. Springer Verlag, 1997.
J.H. Cheon, N. Hopper, Y. Kim, and I. Osipkov. Timed-release and key-insulated public key encryption. Cryptology ePrint Archive, Report 2004/231, 2004.
G.D. Crescenzo, R. Ostrovsky, and S. Rajagopalan. Conditional oblivious transfer and timed-release encryption. Lecture Notes in Computer Science, 1592:74 ff., 1999.
Y. Dodis and D.H. Yum. Time capsule signature. Conference: Financial Cryptography 2005.
T. ElGamal. A public key cryptosystem and a signature scheme based on discrete logarithms. IEEE Trans. Information Theory, IT-31(4): 469-472, 1985.
P. Feldman. A practical scheme for non-iterative verifiable secret sharing. IEEE Symposium on Foundations of Computer Science, pp. 427-437, 1987.
M.J. Sishman and K.M. Hagerty. The mandatory disclosure of trades and market liquidity. The Review of Financial Studies, 8(3):637 ff., 1995.
Y. Frankel, P.D. MacKenzie, and M. Yung. Robust efficient distributed RSA-key generation. In Proceedings of the seventeenth annual ACM symposium on Principles of Distributed Computing, p. 320, 1998.
R. Gennaro, S. Jarecki, H. Krawczyk, and T. Rabin. Secure distributed key generation for discrete-log based cryptosystems. Lecture Notes in Computer Science, 1592:295 ff., 1999.
A. Herzberg, M. Jakobsson, S. Jarecki, H. Krawczyk, and M. Yung. Proactive public key and signature systems. In ACM Conference on Computer and Communications Security, pp. 100-110, 1997.
T.C. May. Timed-release crypto. in The Cyphernomicon: Cypherpunks FAQ and More, v. 0.666, chapter 14.5. Sep. 1994.
A. Menezes, P. Oorschot, and S. Vanstone. Handbook of Applied Cryptography. CRC Press, 1997.
R.C. Merkle. Secure communications over insecure channels. Communications of the ACM, 21 (4):294-229, Apr. 1978.
A. Fiat and A. Shamir. How to prove yourself: practical solutions to identification and signature problems. In Proceedings of CRYPTO '86, pp. 186-194, 1987.
T.P. Pedersen. Non-interactive and information-theoretic secure verifiable secret sharing. In Advances in Cryptology—CRYPTO, Lecture Notes in Computer Science, pp. 129-140. Springer Verlag, 1991.
J. Kilian. A note on efficient zero-knowledge proofs and arguments. In Proceedings of STOC '92, pp. 723-732, 1992.
A. Shamir. How to share a secret. Communications of the ACM, 22 (11):612-613, Nov. 1979.
G. Brassard, D. Chaum, and C. Crepeau. Minimum disclosure proofs of knowledge. Journal of Computer and System Sciences, 37:156-189, 1988.
E. Brickell, D. Chaum, I. Damgard, and J.V. de Graaf. Gradual and verifiable release of a secret. In Proceedings of CRYPTO '87, vol. LNCS 293, pp. 156-166, 1988.
J. Camenisch and V. Shoup. Practival verifiable encryption and decryption of discrete logarithms. Full length version of extended abstract in Proc. Crypto 2003, available at http://eprint.iacr.org/2002/161.pdf, 2003.
I. Damgard, T. Pedersen, and B. Pfitzmann. Statistical secrecy and multibit commitments. IEEE Transactions on Information Theory, 44(3): 1143-1151, 1998.
J. McHugh. Covert channel analysis. Chapter 8 of Handbook for the Computer Security Certification of Trusted Systems, NRL Technical Memorandum, available at http://chacs.nrl.navy.mil/publications/handbook/COVCHAN.pdf, 1996.

Stubblebine S.G. et al: Fair on-line auctions without special trusted parties: Financial Cryptography. Third International Conference, FC'99. Proceedings (Lecture Notes in Computer Science vol. 1648) Springer-Verlag Berlin, Germany, 1999, pp. 230-240, XP002509558 ISBN: 3-540-66362-2.

Rivest R.L. et al: "Time lock puzzles and time release Crypto" Internet Citation, [Online] pp. 1-9, XP002327209 Retrieved from the Internet: URL: http://theory.lcs.mit.edu/rivest/RivestShamirWagner-timelock.pdf> [retrieved on May 4, 2005].

M.O. Rabin and J.O. Shallit. Randomized algorithms in number theory. Communications in Pure and Applied Mathematics, 39:239-256, 1986.

M.O. Rabin and C. Thorpe. Time-lapse cryptography. Technical Report TR-22-06, Harvard University School of Engineering and Computer Science, 2006.

P.G. Bradford, S. Park, and M.H. Rothkopf. Practical completion incentive problems in cryptographic Vickrey auctions. Technical Report RRR Mar. 2004, Rutgers Center for Operations Research (RUTCOR), 2004.

F. Brandt and T. Sandholm. (Im)possibility of unconditionally privacy-preserving auctions. In Proc. 3rd Int. Conf. on Autonomous Agents and Multi-Agent Systems, pp. 810-817, 2004.

M. Lepinski, S. Micali, and a. shelat. Fair zero-knowledge. In Proc. Theory of Cryptography Conference, pp. 245-263, 2005.

M.O. Rabin, R.A. Servedio, and C. Thorpe. Highly efficient secrecy-preserving proofs of correctness of computations and applications. In Proc. IEEE Symposium on Logic in Computer Science, 2007.

Shepherd Smith & Edwards. Citigroup, Merrill Lynch and Lehman ex-brokers face retrial in eavesdropping case. Stockbroker Fraud Blog, May 27, 2007. http://www.stockbrokerfraudblog.com/2007/05/exbrokers_of_citigroup_merrill_1.html.

S.W. Smith. Trusted Computing Platforms: Design and Applications. Springer, New York, 2005.

C. Thorpe and D.C. Parkes. Cryptographic securities exchanges. In Proc. Financial Cryptography and Data Security, 2007.

Notification of Transmittal of the International Search Report and the Written Opinion of the International Searching Authority, or the Declaration, International Application No. PCT/US2007/068373.

* cited by examiner

PRACTICAL SECRECY-PRESERVING, VERIFIABLY CORRECT AND TRUSTWORTHY AUCTIONS

CROSS-REFERENCE TO RELATED APPLICATIONS

This application is a US national phase entry under 35 U.S.C. §371 of PCT/US2007/068373 filed May 7, 2007, which claims the benefit of priority of U.S. Provisional Application Ser. No. 60/798,121 filed May 5, 2006, both of which is incorporated herein by reference in their entirety.

FEDERALLY SPONSORED RESEARCH

This invention was made with government support under CCR-0205423 awarded by the National Science Foundation. The Government has certain rights in the invention.

BACKGROUND OF INVENTION

1. Field of Invention

Method and apparatus for facilitating verifiably correct auctions.

2. Discussion of Related Art

In recent years, auctions and electronic marketplaces have been used to facilitate trillions of dollars in trade in the world economy. Individual events, for instance, the procurement of truckload services by Proctor and Gamble, approach $1 billion in transaction value. The eBay marketplace reported a record $44.3 billion volume in the 2005 calendar year, representing a 30% increase over 2004. Governments world-wide use auctions to allocate property rights, including high profile auctions for wireless spectrum and licenses for new cars. Previously used for rare goods, or for time-sensitive goods (e.g., flowers, fish), auctions can now be harnessed for all kinds of commercial transactions. In a typical week in February, 2006, the U.S. treasury sells more than $25 billion in three-month treasury bills. Most recently sponsored search auctions have driven upwards of $1 billion in revenue to Google in a single quarter.

Despite this success, there is increasing evidence that fraud is an issue that can plague electronic auctions. Indeed, a number of authors have argued that the reason that theoretically appealing auctions such as Vickrey auctions are rare in practice is because of the problem of fraud and untrustworthy auctioneers. Two kinds of manipulations come to mind. The first is an auctioneer that deviates from the rules of an auction. This problem can be alleviated at a cost in privacy by the public revelation, and verification of all bids. Another, more subtle and harder to prevent problem can occur when an auctioneer is in collusion with some bidders, perhaps conveying useful information about bids received during the bidding process. Other fraud possibilities that arise in electronic auctions include refusal of the auctioneer to accept bids into the auction and refusal by bidders to reveal bids after the bid submission deadline.

SUMMARY OF INVENTION

We have developed a practical protocol for verifiably correct auctions that prevents such manipulation and fraud. One implementation of the verifiably correct auction occurs in a sealed bid auction. One aspect of its practicality and acceptance by the public is having a clearly understandable and convincing solution accessible to knowledgeable people who are not experts on the intricacies of cryptography and general zero knowledge proofs. To that end, we have carefully examined the role of all parties in a sealed-bid auction and in one embodiment formalized their role in a cryptographically sound protocol. According to one aspect of the invention, we consider who among them needs to know what, and when; based on that, we have constructed a protocol whose primary aim is practicality. Another aspect of the invention touches on the real-world issues that arise in the actual implementation of such a system. In one example, our protocol provides clear proofs of correctness that reveal minimal knowledge to the parties involved, yet is easily implemented and requires no special technology on the part of the bidders. In particular, after the closing of the auction and announcement of the winner or winners and the prices paid, the fact that these were determined according to the announced auction rules can be verified without revealing any bid values. This aspect of the invention is commercially very important for participants in repeated auctions for similar items since it allows them to keep their bidding strategy secret.

In one embodiment, we assume only commodity computing resources and a public key infrastructure under which the auctioneer, seller, bidders, and notaries all possess public/private key pairs for digital signatures. The auctioneer holds a private key for bid encryptions and publishes an appropriately certified public key. Bids are encrypted by bidders using this public key, although encrypted bids are kept secret from the auctioneer until an auction closes. The cryptographic methods of homomorphic encryption are used in providing verifiable correctness and trustworthiness.

According to one aspect of the invention, we thus present a framework for auctions that is both practical and secrecy preserving, while providing for verifiably correct and trustworthy auctions. In one embodiment, we focus on two aspects of practicality. First, the auction should clear in reasonable time and with reasonable communication requirements, even for a large number of bidders. Second, the computational architecture should be consistent with practical business models. To achieve this we focus on proofs of correctness rather than secure computation. Unlike previous solutions, we require neither the existence of multiple auctioneers nor that the auctioneers or bidders collaborate to conduct the auction. According to one embodiment, we provide for a process and system involving a single auctioneer that is solely responsible for conducting the auction and independent verification of the auction by third parties.

In one embodiment, we preserve secrecy by keeping bid information secret from everyone except the auctioneer, and keeping bid information secret even from the auctioneer until the auction closes. The only information revealed to the public is that implied by the outcome of the auction, that is, that implied by the identity of the winner or the payment made by the winner. In a certain embodiment, a secrecy-preserving verification protocol allows anyone, including bidders and third parties, to verify that the auction was correct: the auctioneer correctly determined the winner(s) and associated payment(s) according to published rules. Trustworthiness may be supported by carefully ensuring that all bidders must follow through with information about bids of pre-committed value and quantity after an auction closes, and the auctioneer must accept and respect all bids in determining the outcome.

In a certain embodiment, in addition to a seller, multiple bidders, and an auctioneer, our process and system may include the following: Notaries that can ensure the security of auction by acting as witnesses. Notaries may witness bid submission in order to protect a bidder against an auctioneer who tries to ignore her bids. They may also be used to enforce no repudiation of bids after the auction is closed. Delayed private key revelation services can be used to prevent a bidder from refusing to respect commitments he or she has made during the auction protocol.

According to one aspect of the invention, our auction process ensures verifiable correctness and trustworthiness. Although an auctioneer learns the values of bids submitted after an auction closes, an auctioneer is not able to use this information to change the outcome in the auction or provide an advantage to any bidder. Thus, we prevent a "bad apple" within the auctioneer's organization from being able to profitably leak information during the course of an auction. On the other hand, and at a considerable gain in simplicity, in one embodiment we have chosen not to algorithmically protect against an auctioneer revealing bid values and quantities after an auction has closed and the outcome has been announced. Our process and system does not provide any algorithmic enforcement for this additional privacy protection. In solving what we view as the first-order problem of trustworthiness during the execution of an auction, we choose to push these secondary considerations into the realm of contractual obligations and the auctioneer's business reputation. An additional benefit, in addition to simplicity and practicality, is that this architecture will also allow for extensions to combinatorial auctions for which fully-private computational techniques cannot scale.

We observe that complete secrecy by the auctioneer can be provided, in cases where it is deemed absolutely essential, by appeal to hardware solutions. Trusted servers, with specially designed hardware and software audited by third parties for correctness, and installed in physically secure locations with ongoing monitoring and auditing, can prevent the leaking of information with high assurance. In fact, with such deliberately opaque servers it is of the utmost import that an auction participant can independently verify the correctness of the outcome of an auction and be assured that there is no fraud. Thus, such technological methods to eliminate secrecy leaks are very well complemented by our processes and systems for verifiable correctness.

To demonstrate the scalability of our technology, we have conducted preliminary timing tests (discussed further below), on a certain embodiment. In this exemplary illustration, we show that for acceptable strength of the cryptographic security key, single or multi-item auctions with 100 bidders can be prepared in around two hours of computation and verified in less than half an hour, all on a standard (2.8 GHz Pentium 4) PC. We also show that the computations scale linearly with the number of bidders. Because our method and apparatus is easily parallelizable, it is possible to accommodate even tens of thousands of bidders in at most a day of computation on a 64-node network.

According to one aspect of the present invention, a method for conducting a verifiably correct auction is provided. The method comprises acts of providing an encryption key for encrypting bid information, providing for a bidder to submit encrypted bid information, permitting an auction operator to receive the encrypted bid information, providing for posting of the encrypted bid information, permitting the auction operator to decrypt the encrypted bid information after bidding closes to determine an outcome of an auction, and providing for the auction operator to publish proof information for verifying the outcome of the auction.

According to one embodiment of the invention, the method further comprises providing bid submission rules that require the auction operator to maintain secrecy of bids. According to another embodiment, the encrypted bid information comprises a digitally signed bid commitment. According to another embodiment, the method further comprises acts of generating an encrypted bid using the encryption key and a help value, generating a cryptographic commitment as part of the bid commitment, and digitally signing the bid commitment. According to another embodiment, the bid commitment further comprises at least one of the cryptographic commitment, a cryptographic commitment generated from a random string, and an auction identifier.

According to one embodiment of the invention, the method further comprises acts of submitting the digitally signed bid commitment before the close of the auction, and submitting the encrypted bid after the close of bidding. According to another embodiment, the act of generating a cryptographic commitment as part of the bid commitment further comprises using a cryptographic hash function. According to another embodiment, the method further comprises an act of providing for the bidder to submit the encrypted bid information to a witness. According to another embodiment, the method further comprises an act of permitting the witness to submit the encrypted bid information. According to another embodiment, the act of providing for the bidder to submit encrypted bid information further comprises providing for the bidder to submit the encrypted bid information to a bulletin board. According to one embodiment of the invention, the bulletin board includes a web page.

According to another embodiment, the method further comprises acts of providing an additional encryption key through an encryption key revelation service, providing for the bidder to generate an encrypted bid using the encryption key and a help value, and providing for the bidder to encrypt the encrypted bid using the additional encryption key. According to another embodiment, the act of providing for a bidder to submit encrypted bid information, further comprises chain-encrypting the encrypted bid information. According to another embodiment, the encryption key is a combined key generated from distributed data.

According to another embodiment, the outcome of the auction is an intermediate step in determining a final result of the auction. According to another embodiment, the method further comprises the act of permitting anyone to verify the outcome of the auction based on the submitted encrypted bid information and the proof information. According to another embodiment, the method further comprises the act of preventing the auction operator from learning information contained in a bid prior to close of bidding. According to another embodiment, the act of permitting the auction operator to decrypt the encrypted bid information after the close of bidding further comprises using a decryption key known only to the auction operator.

According to one aspect of the present invention, a computer-readable medium having computer-readable signals stored thereon that define instructions that, as a result of being executed by a computer, instruct the computer to perform a method for conducting a verifiably correct auction is provided. The method comprises acts of providing an encryption key for encrypting bid information, providing for a bidder to submit encrypted bid information, permitting an auction operator to receive the encrypted bid information, providing for posting of the encrypted bid information, permitting the auction operator to decrypt the encrypted bid information after bidding closes and to determine an outcome of an auction, and providing for the auction operator to publish proof information for verifying the outcome of the auction. According to one embodiment of the invention, the method further comprising providing bid submission rules that require the auction operator to maintain secrecy of bids. According to another embodiment, the encrypted bid information comprises a digitally signed bid commitment. According to another embodiment, the method further comprises acts of generating an encrypted bid using the encryption key and a help value, generating a cryptographic commitment from the encrypted bid as part of the bid commitment, and digitally signing the bid commitment.

According to one embodiment of the invention, the bid commitment further comprises at least one of the generated cryptographic commitment, a cryptographic commitment generated from a random string, and an auction identifier. According to another embodiment, the method further comprises acts submitting the digitally signed bid commitment before the close of the auction, and submitting the encrypted bid after the close of the auction. According to another embodiment, the act of generating a cryptographic commitment as part of the bid commitment further comprises using a cryptographic hash function. According to another embodiment, the method further comprises an act of providing for the bidder to submit the encrypted bid information to a witness. According to another embodiment, the method further comprises an act of permitting the witness to submit the encrypted bid information. According to another embodiment, the act of providing for a bidder to submit encrypted bid further comprises providing for a bidder to submit encrypted bid information to a bulletin board. According to another embodiment, the bulletin board includes a web page.

According to one embodiment of the invention, the method further comprises acts of providing an additional encryption key through an encryption key revelation service, providing for the bidder to generate an encrypted bid using the encryption key and a help value, and providing for the bidder to encrypt the encrypted bid using the additional encryption key. According to another embodiment, the act of providing for a bidder to submit encrypted bid information comprises encrypting the encrypted bid information at least one time. According to another embodiment, the encryption key is a combined key generated from shared data. According to another embodiment, the outcome of the auction is an intermediate outcome in determining a final result of the auction. According to another embodiment, the method further comprises an act of permitting anyone to verify the outcome of the auction based on the submitted encrypted bid information and the proof information.

According to one embodiment of the invention, the method further comprises the act of preventing the auction operator from learning information contained in a bid prior to close of bidding. According to another embodiment, the act of permitting the auction operator to decrypt the encrypted bid information after the close of bidding further comprises using a decryption key known only to the auction operator.

According to one aspect of the present invention, a system for conducting a verifiably correct auction is provided. The system comprises a communication component that communicates information related to an auction, wherein the information related to the auction includes an encryption key, encrypted bid information, and proof information for verifying an outcome of the auction, an encryption component that generates encrypted bid information, a decryption component that is configured to decrypt the encrypted bid information only after bidding closes to determine an outcome of the auction, a proof component that generates the proof information for verifying the outcome of the auction, and a verification component that verifies the outcome of the auction based on the encrypted bid information and the proof information. According to one embodiment of the invention, the system requires the auction operator to maintain secrecy of bids. According to another embodiment, the encrypted bid information further comprises a digitally signed bid commitment.

According to another embodiment, the encryption component is further adapted to generate an encrypted bid using the encryption key and a help value. According to another embodiment, the encryption component is further adapted to generate a cryptographic commitment from the encrypted bid as part of a bid commitment; and adapted to digitally sign the bid commitment.

According to one embodiment of the invention, the bid commitment includes at least one of the cryptographic commitment from the encrypted bid, a cryptographic commitment generated from a random string, and an auction identifier. According to another embodiment, the communication component receives a signed bid commitment before the close of the auction, and receives the encrypted bid after the close of the auction. According to another embodiment, the cryptographic commitment is generated using a cryptographic hash function. According to another embodiment, the system further comprises a witness component that witnesses encrypted bid information received by the communication component. According to another embodiment, the witness component is further adapted to submit the encrypted bid information. According to another embodiment, the communication component includes a bulletin board. According to another embodiment, the communication component includes a web page.

According to another embodiment, the system further comprises an encryption key revelation component. According to one embodiment of the invention, the encryption key revelation component generates an additional encryption key, and wherein the encryption component is further adapted to generate encrypted bid information using the encryption key and the additional encryption key. According to another embodiment, the encryption component is further adapted to chain-encrypt the encrypted bid information. According to another embodiment, the encryption key is a combined key generated from shared data. According to another embodiment, the decryption component is further adapted to determine an intermediate outcome of the auction. According to another embodiment, the proof component permits anyone to verify the outcome of the auction based on the submitted encrypted bid information and the proof information. According to another embodiment, the decryption component is further adapted to prevent the auction operator from learning information contained in a bid prior to close of bidding. According to another embodiment, the decryption component is further adapted to decrypt the encrypted bid information only after the close of bidding using a decryption key known only to the auction operator.

According to one aspect of the present invention, a method for conducting a verifiably correct auction is provided. The method comprises acts of providing an encryption key for encrypting bid information, providing for a bidder to submit encrypted bid information, permitting an auction operator to receive the encrypted bid information, providing for posting of the encrypted bid information, permitting the auction operator to decrypt the encrypted bid information to determine an outcome of an auction, and providing for the auction operator to publish proof information for verifying the outcome of the auction.

According to one aspect of the present invention, a computer-readable medium having computer-readable signals stored thereon that define instructions that, as a result of being executed by a computer, instruct the computer to perform a method for conducting a verifiably correct auction is provided. The method comprises acts of providing an encryption key for encrypting bid information, providing for a bidder to submit encrypted bid information, permitting an auction operator to receive the encrypted bid information, providing for posting of the encrypted bid information, permitting the auction operator to decrypt the encrypted bid information to determine an outcome of an auction, and providing for the auction operator to publish proof information for verifying the outcome of the auction.

According to one aspect of the present invention, a system for conducting a verifiably correct auction is provided. The system comprises a communication component that communicates information related to an auction, wherein the information related to the auction includes an encryption key, encrypted bid information, and proof information for verifying an outcome of the auction, an encryption component that generates encrypted bid information, a decryption component that is configured to decrypt the encrypted bid information to determine an outcome of the auction, a proof component that generates the proof information for verifying the outcome of the auction, and a verification component that verifies the outcome of the auction based on the encrypted bid information and the proof information.

According to another aspect of the invention, a system for conducting a verifiably correct auction is provided. The system comprises a client computer system, wherein the client computer system includes a communication component that communicates information related to an auction including encrypted bid information, an encryption component that generates encrypted bid information, and a verification component that verifies the outcome of the auction based on the encrypted bid information and proof information.

Such a system, according to one embodiment, provides a method for conducting a verifiably correct auction comprising the acts of providing for a bidder to submit encrypted bid information and providing for the bidder to verify the outcome of the action from the encrypted bid information and proof information.

According to one aspect of the invention, a system for conducting a verifiably correct auction is provided. The system comprises a sever computer system, wherein the server computer system includes a communication component that communicates information related to an auction including an encryption key and proof information for verifying an outcome of the auction, a decryption component that is configured to decrypt encrypted bid information to determine an outcome of the auction, a proof component that generates the proof information for verifying the outcome of the auction, and a verification component that verifies the outcome of the auction based on the encrypted bid information and the proof information.

Such a system, according to one embodiment, provides a method for conducting a verifiably correct auction, comprising providing an encryption key for encrypting bid information, providing for an auction operator to receive the encrypted bid information, providing for posting of the encrypted bid information, providing for the auction operator to decrypt the encrypted bid information after bidding closes to determine an outcome of an auction, and providing for the auction operator to publish proof information for verifying the outcome of the auction.

According to another aspect of the invention, a distributed computer system for conducting a verifiably correct auction is provided. The distributed computer system comprises a client computer system and a server computer system. The client computer system further comprises a communication component that communicates information related to an auction including encrypted bid information, an encryption component that generates encrypted bid information, and a verification component that verifies the outcome of the auction based on the encrypted bid information and proof information. The server computer system further comprises a communication component that communicates information related to an auction including an encryption key and proof information for verifying an outcome of the auction, a decryption component that is configured to decrypt encrypted bid information to determine an outcome of the auction, a proof component that generates the proof information for verifying the outcome of the auction, and a verification component that verifies the outcome of the auction based on the encrypted bid information and the proof information.

DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. The drawing are presented by way of illustration only and are not intended to be limiting. In the drawings.

DETAILED DESCRIPTION

Figure 1A:
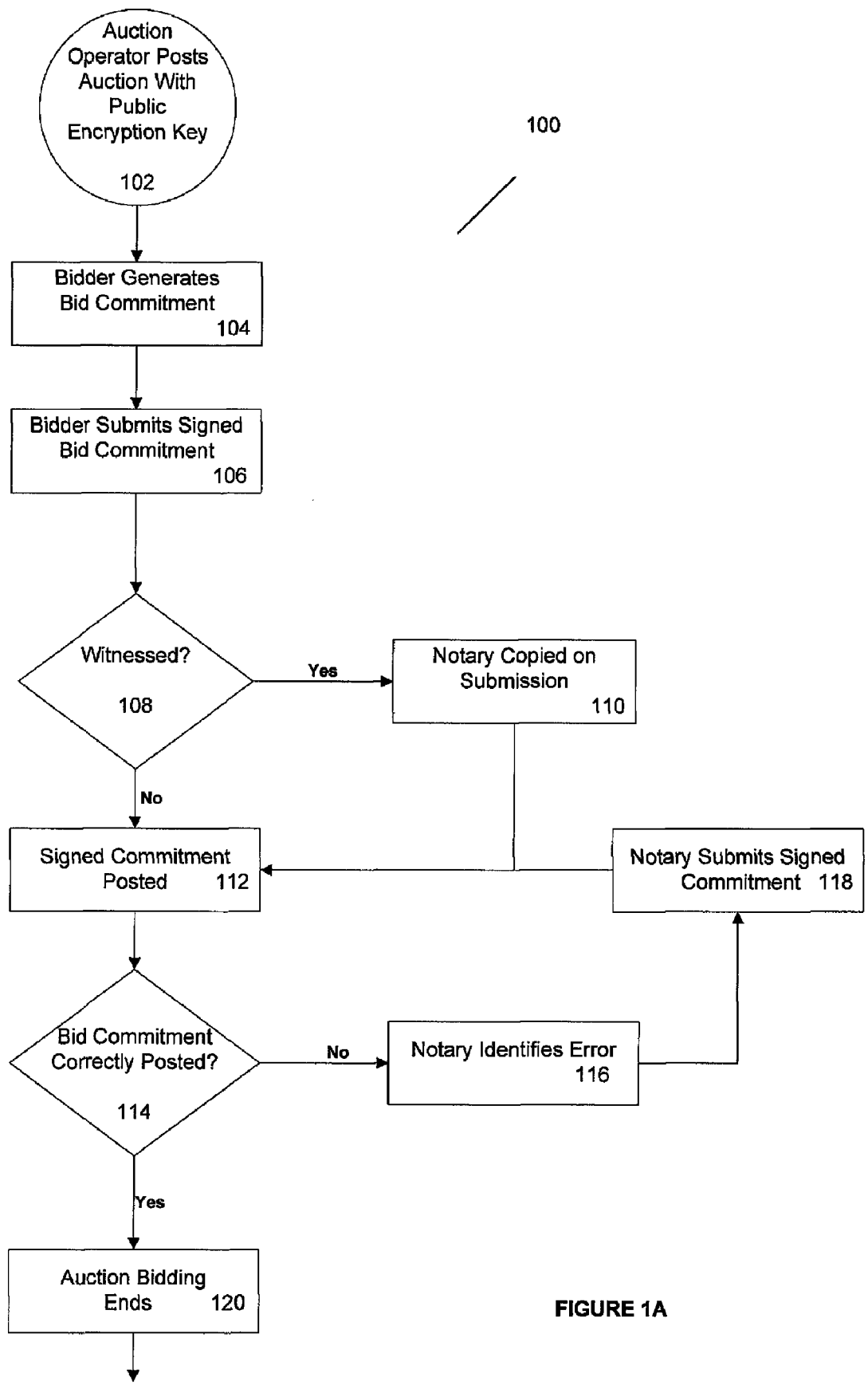
FIG. 1A is a flow chart of a process for conducting a verifiably correct auction according to one embodiment of the invention.

This invention is not limited in its application to the details of construction and the arrangement of components set forth in the following description or as illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Much of the previous work on the use of cryptography for conducting verifiably correct and trustworthy auctions has focused on the goal of complete privacy. This is typically achieved through assuming two or more trusted third parties, either with numerous auctioneers or with asymmetric models in which the commercial entity of an auction issuer is assumed in addition to the auctioneer. Some conventional protocols achieve this property through bidder-resolved multi-party computation. In comparison, according to one aspect of the invention we use verifiable correctness and trustworthiness in combination with complete privacy to all parties except the auctioneer. As discussed above, in one embodiment the auctioneer cannot learn any information about bids until the auction has closed. In another aspect of the invention, we provide a non-interactive protocol that is especially simple from a bidder's perspective, and as trusted third parties we use only notaries, which provide a lightweight "witness" service and are independent business entities that already exist in practice. In the same spirit, whereas previous architectures use cryptography for anonymity, in a certain embodiment we adopt business entities (e.g., notaries as proxy bidders) for this purpose. Note that achieving information-theoretic guarantees on privacy is impossible in a single-item Vickrey auction and in many multi-item auctions. The reason for this is that the definition of the Vickrey price implies information about other bidder's private bids and, if applicable, desired allocation.

Where threshold trust models with multiple auction servers have been criticized, one aspect of the invention provides for business realism. In a certain embodiment, we choose to adopt standard methods from homomorphic encryption combined with test sets and eschew more complex cryptographic ideas such as secure multi-party computation, obfuscation of circuits, and oblivious transfer. We share the use of homomorphic encryption with some prior art systems, but provides a simpler solution through the use of a single auctioneer in place of the two server model adopted in their work (with the seller and an auction authority working interactively to generate zero-knowledge proofs of correctness). Threshold trust models with multiple auction servers gain stronger privacy properties, but in return require this additional complexity (and require that the auction authority and seller not collude).

According to one aspect of the invention, an advantage of our approach is that it can be extended to secrecy-preserving multi-item auctions and combinatorial auctions while leveraging the benefits of fast winner-determination algorithms. The auctioneer must simply construct a proof that the outcome is correct, but need not involve multiple parties in computing the outcome. In contrast, earlier work on multi-item auctions either assumes distributed trust, or adopts multi-party computation techniques. Thus, the current state-of-the-art for secure combinatorial auctions is still not very scalable. Nor is it practical in a business setting.

Desired Auction Properties

Based on the above, we list desired data for our auction process according to one aspect of the invention.

Non-repudiation by bidders: Once a bidder submits a bid, her bid is provably unalterable. Moreover, a bidder is committed to finally revealing her bid.

Non-repudiation by auctioneer: The auctioneer's exclusion of a properly submitted bid can be conclusively proven and thus becomes legally actionable.

Trustworthiness: The auctioneer cannot know the bids until after the close of the bid submission phase. Thus the auctioneer cannot collude with bidders by sharing others' bids during the auction.

Verifiable correctness: The public and bidders receive a proof of which bids won, and (if applicable) a proof of the correctness of their own payments. The auction protocol enforces that the auctioneer computes the correct winners and payments; an auctioneer will not be able to present valid proofs for invalid winners or payments.

Privacy: The bids, items won by whom, and payments need not be made public and are not available to the auctioneer until all bids are committed.

As discussed with greater detail below, a typical embodiment can encompass various real-world components to accomplish the teachings of the invention. Some exemplary, non-limiting examples include:

Real-World Components

In one embodiment, our auction system comprises an auctioneer AU, bidders $B=\{B_1, \ldots, B_k\}$, and a seller. Bidders can also be proxies to provide anonymity. In addition, in another embodiment we use a universally accessible, tamper resistant clock and may use the following three components:

Certified Bulletin Board

According to another aspect of the invention, the auctioneer maintains a certified bulletin board. This can be a publicly known website maintained and updated by the auctioneer. The auctioneer uses the bulletin board to post all public information about the auction, including the initial auction announcement as well as (encrypted) information about bids that have been submitted and proofs that can be used to verify the results. All posts to the bulletin board should carry appropriate digital signatures.

Notaries

In a further aspect of the invention, notaries $N=\{N_1, \ldots, N_m\}$ are reputable agents, such as law firms, accountants, or firms specializing in providing a witness for bidders. When preparing to participate in an auction, a bidder may select a set of notaries of her choosing from some set of notaries authorized by the auctioneer. In using a notary, whenever a bidder sends bid information to the auctioneer she also sends the information to the notary. The notary also submits this information to the auctioneer. The notaries act as witnesses in the case that a bidder notices that an auctioneer does not post correct information to the bulletin board. In one embodiment, our process may be so structured that no information about the actual bids is revealed to the notaries, and their only role is to serve as witnesses in case of a dispute between a bidder and the auctioneer.

Delayed Private Key Revelation Services

In yet another aspect of the invention, a delayed private key revelation service continually publicizes at specified time intervals, say every day, new public encryption keys. At a specified time interval, say one week, after the publication of a public encryption key the service publishes the corresponding private decryption key. The service is secure in that no information about the private decryption key corresponding to a published encryption key is available to anybody before the declared elapsed time interval between the publication of these two keys. According to one embodiment, we mention parenthetically that for our purposes, the length of the time interval needs to be long enough for bidders to use the public key to encrypt their bids, send a commitment to those, and the auctioneer to collect all the bids before the private key is released.

As discussed with greater detail below, an exemplary implementation of a method for performing a verifiably correct auction is discussed. As one skilled in the art would realize the various steps may be used together or implemented in a different order. Some steps implemented below are optional and should not be read as limiting the scope of the invention.

Overall Flow and Main Steps of Auction

Figure 1B:
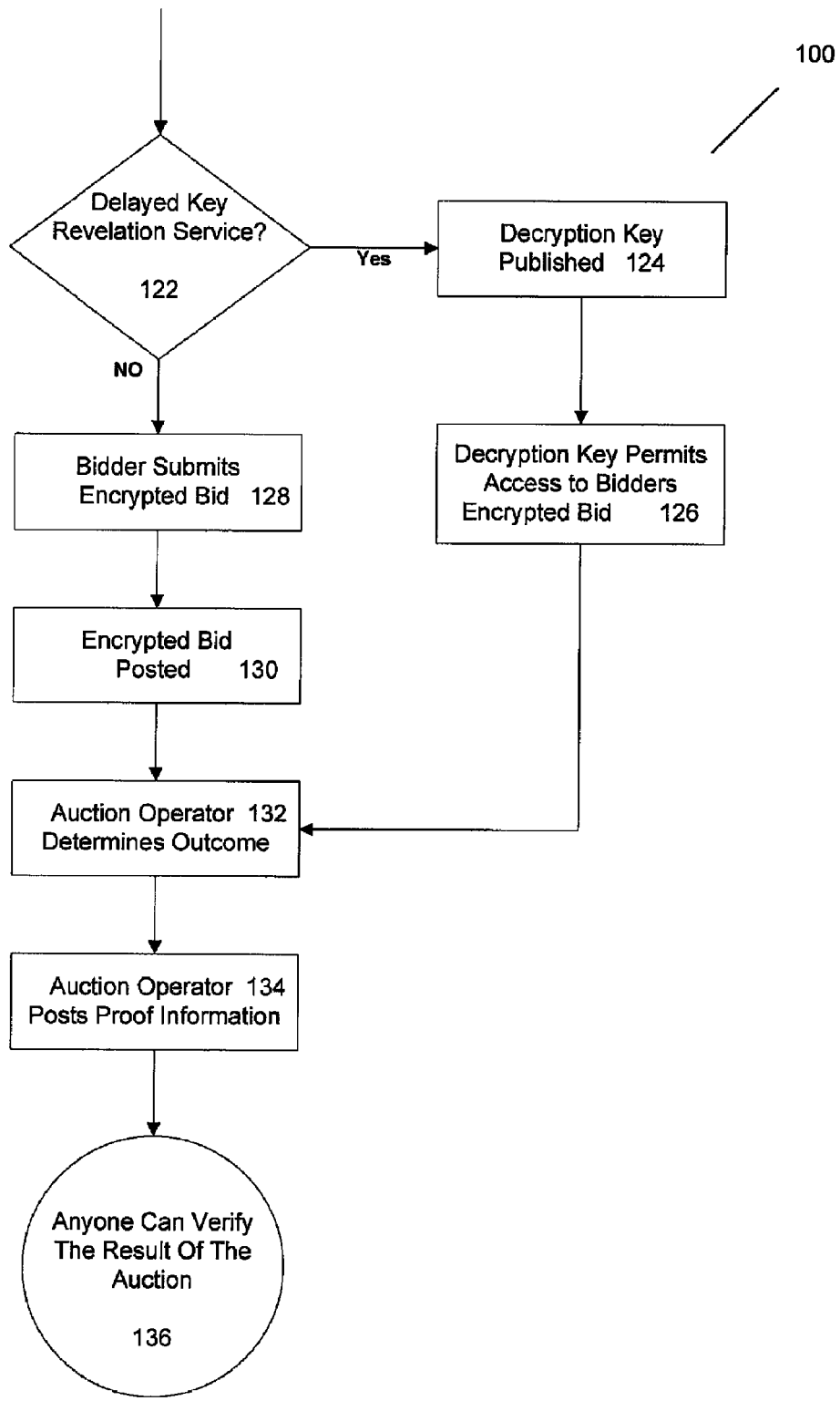
FIG. 1B is a flow chart continuing the process for conducting a verifiably correct auction according to one embodiment of the invention.

FIGS. 1A-1B, show the flow of an illustrative method for conducting a verifiably correct auction. Schematically, one embodiment of a method for conducting a verifiably correct auction will proceed in three main stages. In the first stage, the auctioneer posts the auction announcement on the bulletin board. The announcement, to be detailed later on, includes a deadline time T for submitting bids. In one example, this first stage is performed at step 102 of process 100. In the second stage, the bidders commit to bids but post bid information in a form that hides bid values even to the auctioneer. The bid commitment may be created by first encrypting the bid with the auctioneer's public key, then computing a hash value of this encrypted bid, and finally digitally signing the said hash value. In one embodiment, generation of bid commitments occurs according to illustrative process 200, FIG. 2. Notaries can be engaged in this stage to prevent the auctioneer from refusing to post legitimate bid commitments. According to one example, a bidder submitting her bid commitment to the auctioneer can in addition submit it to the notaries. The notaries may monitor the auction bulletin board and witness the bid commitment a bidder submits is properly published. In another example, the second stage of the verifiably correct auction, is implemented in steps 104-120 of process 100. In the final stage the bidders reveal the encryptions of their bids to the auctioneer and the public. According to one aspect of the invention, the auctioneer and other bidders verify that these encrypted bids are consistent with the posted commitments. In one embodiment, verification of encrypted bids occurs according to illustrative process 600, of FIG. 6 discussed infra. In another embodiment, the auctioneer then decrypts the bids in secret, and performs computation to determine the optimal outcome of the auction. According to another embodiment, the auctioneer then posts public proofs that the selection of the winner(s) and their payments was done according to the auction rules. In another example, after the last posting, everybody can verify the correctness of the outcome. In yet another example, the final stage of the verifiably correct auction is implemented in steps 122-136 of process 100.

With reference to FIG. 1A-B, an exemplary process 100 for conducting a verifiably correct auction is illustrated. As shown, at 102, an auction operator posts an auction announcement with an encryption key. The auction announcement may also contain additional information related to conducting the verifiably correct auction. Additional information may include the auction format, the quantity of items being auctioned, maximum/minimum quantities, reserve price, and any other information the auction operator wished to include in the auction.

Figure 2:
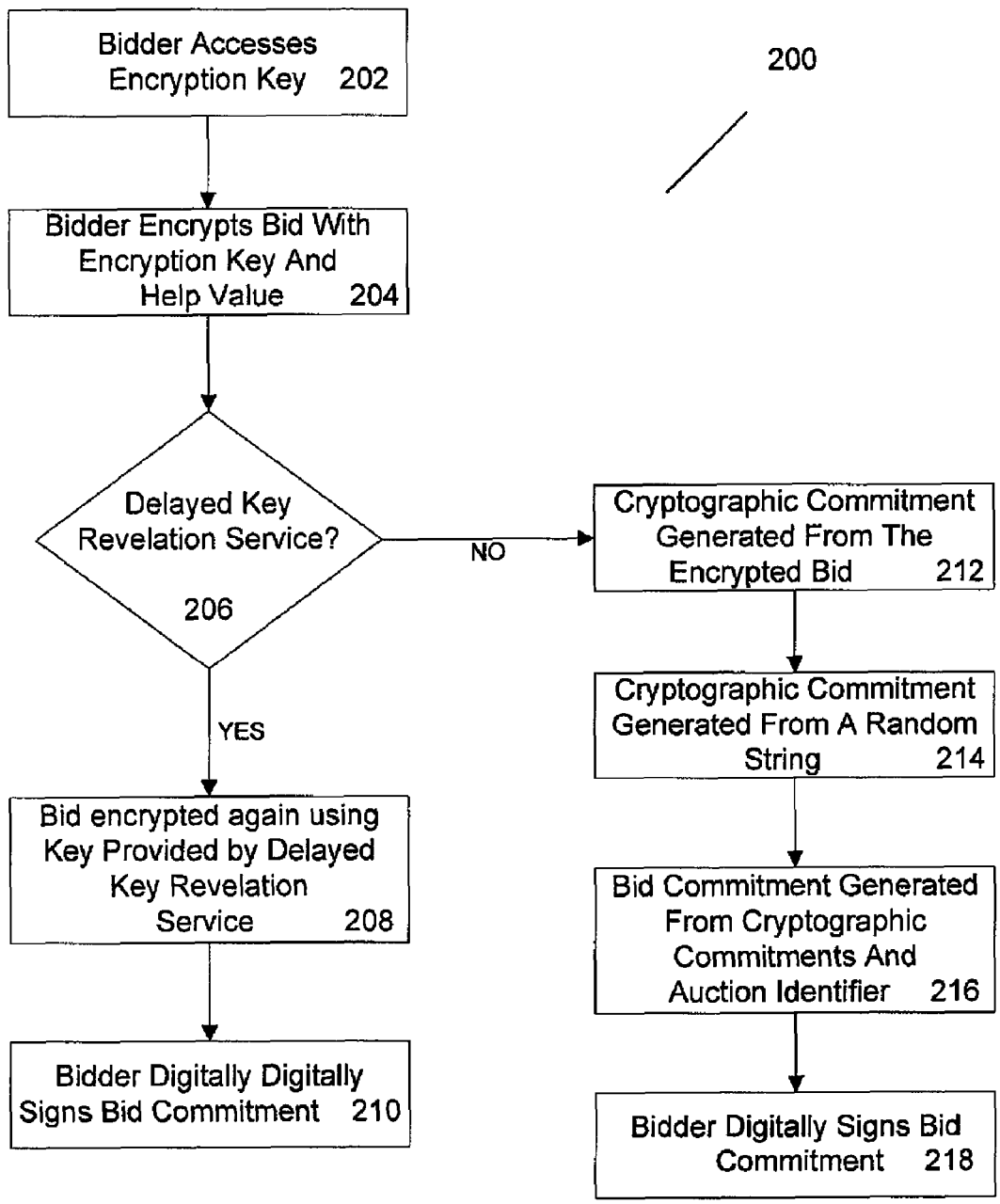
FIG. 2 is a flow chart of a process for generating a bid commitment according to the teachings of the invention.

At 104, a bidder wishing to participate in the verifiably correct auction generates a bid commitment, one illustration of a method to generate a bid commitment is discussed with greater detail in FIG. 2, using the provided encryption key. At 106, the bidder submits a digitally signed bid commitment. At 108, the process checks for whether the bid is to be witnesses (yes) or not (no). Optional step 110 may be performed if the verifiably correct auction uses a witness service. In a certain embodiment of the method, an auction operator may identify a specific set of notaries to use as witnesses to the submission of digitally signed bid commitments as part of the additional information related to conducting the verifiably correct auction. If submissions are to be witnessed 108 (yes) a notary is copied on the submission at 110. At step 112, the digitally signed bid commitment is posted on the auction bulletin board. The bulletin board may take the form of a web page or other electronic distribution service. At step 114, a bidder verifies that the digitally signed bid commitment was properly posted. If the digitally signed bid commitment was not posted or contains errors, (114 No) a bidder may identify the error to the notary if the notary has been used. At 116, the notary will identify the error in the posted digitally signed bid commitment. Identification by the notary may occur by actively monitoring posted information or by the request of a bidder to verify postings. At 118, the notary will submit the digitally signed bid commitment received in step 110. Once it is determined the digitally signed bid commitments have been posted correctly the auction will proceed, until for example, the time set for submitting bids has expired and auction bidding will end, 120.

Optionally, the correction of unposted or incorrectly posted digitally signed bid commitments can occur after the end of bidding for an auction. For example, a notary could identify any errors at the close of bidding and submit the digitally signed bid commitment.

Referring to FIG. 1B, a time after bidding has closed, if a delayed key revelation service is used 122 (yes) a decryption key will be published at 124. The auction operator (as well as anyone else with access to the posted bid commitments and the decryption key published by the delayed key revelation service) may decrypt the posted bid commitments to generate the bidders' encrypted bids, at 126. The auction operator uses the encrypted bids to determine the outcome of the auction at 132.

If a delayed key revelation service is not used, 122 (no), bidders submit their encrypted bids at 128. Each encrypted bid will be posted at 130. At 132 the auction operator determines the outcome of the auction. At 134, the auction operator generates and posts proof information that enables anyone using the information posted during the course of the auction to verify the outcome of the auction, 136.

According to another aspect of the invention, it should be appreciated that the preceding recitation of steps may be repeated to generate intermediate outcomes, and thus allow one to conduct a multi-step auction, where the auction operator may verify each intermediate outcome, as part of the determination of a final result of the auction. In one embodiment, by repeating the recited steps, an auctioneer may generate an intermediate outcome, that is itself verifiable, as an intermediate step to performing computation to determine the optimal outcome of the auction.

Cryptographic Tools

According to one aspect of the invention, our system uses mathematically sound and widely accepted cryptographic tools. According to one embodiment, we describe the tools we employ in our method and apparatus, referring to other publications for established results and providing proofs for new uses of existing tools. In one example, we will sometimes refer to a "prover" P and a "verifier" V when discussing secrecy-preserving proofs of mathematical facts relating to our auctions.

Public Key Infrastructure

According to another aspect of the invention, we use cryptographically sound methods of establishing and exchanging public keys used for all the cryptographic tools we employ. Specifically, in one example, the auctioneer uses a public/private key pair for Paillier encryption. Public keys are used for encryption and private keys for decryption. Notation E(x) or E(x,r) may be used to denote the encrypted value for some input x; an encrypted value may also be referred to as a ciphertext. In one example, a bidder digitally signs a bid commitment as part of the flow of a verifiably correct auction, as shown by a non-limiting example in FIG. 1, at 106. In addition, according to one embodiment, the auctioneer, notaries, and all bidders use public/private key pairs for digital signatures. In one example, the public keys of all parties are mutually known and certified correct. We notate digital signatures as follows: AU can sign message x, generating $Sign_{AU}(x)$. A bidder $B_i$'s signature of x is denoted $Sign_i(x)$.

Commitments

According to another aspect of the invention, cryptographic commitments enable a party to commit to a particular value (such as a bid or number of items desired) without revealing that value until later. In one embodiment, auction participants will, when so prompted, commit to data D by applying a hash function H to data D, then digitally signing that hash value as H(D). In one example, the hash function is required to be perfectly concealing of all information about D, as well as collision resistant in the sense that it is computationally intractable to find two different data values x and y such that H(x)=H(y). In another embodiment, we shall employ a widely used hash function such as Whirlpool or a member of the SHA-2 family.

In addition, according to a further aspect of the invention, our system may employ the delayed private key revelation service for committing to the data D in a manner ensuring timely revelation of the data D when required. In one example, a bidder may encrypt D by use of an encryption key publicized by the delayed private key revelation service before the auction closing time, where the corresponding decryption key will be revealed by the service after the said closing time. Thus after the auction closing time every committed to data can be revealed by anybody by use of the said revealed decryption key. An exemplary process, 200 shows the generation of a bid commitment in FIG. 2.

FIG. 2 provides an illustrative example of one aspect of the present invention, wherein a bidder generates a bid commitment for use in the verifiably correct auction. An exemplary process for generating a bid commitment, 200 is shown. At 202, a bidder accesses the encryption key, and encrypts a bid using the encryption key and a help value, 204. Optionally, a delayed key revelation service may be used in the verifiably correct auction, 206. If a delayed key revelation service is used a bidder encrypts the encrypted bid again using an encryption key provided by the delayed key revelation service, at 208. The bidder uses the encrypted information as a bid commitment and digitally signs it at 210 for use in conducting the verifiably correct auction according to further aspects of the invention.

In the event a delayed key revelation service is not used, in one embodiment, a bidder will generate a cryptographic commitment, which in one embodiment uses a cryptographic hash function, from the encrypted bid at 212. The bidder may also generate a cryptographic commitment on a random string, which in one embodiment includes using a cryptographic hash function, at 214. The bidder uses the generated commitments and includes an auction identifier to create a bid commitment at 216. The bidder then digitally signs the bid commitment at 218 for use in conducting the verifiably correct auction according to further aspects of the invention. This illustrative method for generating a bid commitment should not be read to limit the generation of bid commitment to the steps disclosed. One skilled in the art should understand some of the steps may be omitted. In particular, in one embodiment, a bid commitment may be generated from a cryptographic commitment from the encrypted bid alone. In another embodiment, the cryptographic commitment is a cryptographic hash value of the encrypted bid.

It should be understood by those of skill in the art that the invention is not limited to the illustrative embodiments described in FIGS. 1A-2. The teachings of the invention may be practiced by performing the steps disclosed or some of the steps disclosed.

Sources of Randomness

Cryptographic key generation and probabilistic encryption require a good source of random data. According to one aspect of the invention, we postulate bidders' and notaries' ability to create enough highly random data to create strong key pairs and encrypt or sign a small number of values. We further postulate that the auctioneer has a source of random data sufficient to encrypt large numbers of integers used in the secrecy-preserving proofs described below. Such a source might be hardware that extracts randomness from radio static or quantum noise in diodes. Such "hardware randomness generators" are already in widespread use in applied cryptography. Although such randomness may also be simulated in software.

Delayed Private Key Revelation

According to one aspect of the invention, let $Bid_i$ denote the bid value of bidder $B_i$. In this embodiment, we illustrate the need to guard against a bidder $B_i$, possibly in collusion with the auctioneer, refusing to open her commitment and reveal her encrypted bid $E(Bid_i)$. As an alternative embodiment, to levying fines we can also employ a delayed private key revelation service, DPrKR. Such a service will at regular intervals (say every minute) post a new cryptographic public key followed by posting the associated private decryption key after a fixed period of time (say an hour later).

In a certain embodiment, before time T of the close of the auction, each bidder $B_i$ encrypts $Z=E_{DR}(E(Bid_i))$, in one example this occurs at 104 of process 100, (where the bid is first encrypted with the public key of the auctioneer), and posts $Sign_i(Z)$ on the bulletin board. In one embodiment, this occurs at 106 of process 100. $E_{DR}$ uses a DPrKR public encryption key DR whose private key will be released after time T+1. After time T+1, the decryption key DDR associated with DR will be posted by DPrKR. In one embodiment, this occurs at 124. In one embodiment, this method will be used to allow the auctioneer (and everybody else) to decrypt $Z=E_{DR}(E(Bid_i))$ and recover $E(Bid_i)$ using DDR after time T+1, at 126 if the bidder herself refuses, guaranteeing the auctioneer alone access to $Bid_i$. If so desired, several independent DPrKR services can be used for additional security, either by creating a combined key with shared data from all services and using that key, or by chain-encrypting data with each service's key, e.g. using service A and B to create $E_A(E_B(\ldots(D))$. In one example, chain-encrypting may include the use of a plurality of encryption keys, and the decryption involves sequentially decrypting using a plurality of decryption keys. An exemplary process, 200 shows as an option the use of a delayed key revelation services at steps 206 (yes)-210 in FIG. 2.

Verifiable and Confidential Comparisons

Paillier's encryption scheme enables integer values to be encrypted in such a way that it is possible to perform arithmetic operations on those values using only the encrypted data. What follows is a description of the use of Paillier encryption and the proofs that can generated be employed Public/Private Keys Paillier encryption uses an encryption key $n=p \cdot q$, p and q large primes. The decryption key is based on the factorization of n, $\phi=\phi(n)=(p-1)\cdot(q-1)\cdot\phi(n)$ is Euler's totient function, the number of integers relatively prime to n.

Encryption

To encrypt a plaintext x, first compute a random value r from the range [1,n−1] such that gcd(r,n)=1, then recall that $(1+n)^x \equiv (1+xn) \pmod{n^2}$ and encrypt as $$E(x,r)=(1+xn)\cdot r^n (\bmod\ n^2)$$

Decryption

To decrypt $C=E(x)$, given decryption key $\phi=(p-1)(q-1)$, observe that $r^{n \cdot \phi} \equiv 1 \pmod{n^2}$ by Euler's Totient Theorem, and $$C^\phi = (1+n)^{x \cdot \phi} r^{n \cdot \phi} (\bmod\ n^2)$$
$$= 1 + x\phi n (\bmod\ n^2)$$
$$x = \frac{(C^\phi - 1)/\phi \bmod n^2}{n}$$

Using precomputation and Chinese remaindering as proposed in Paillier's PhD thesis, decryption using the decryption key $\phi$ is much faster.

Decryption with Random Help Value r

It is also possible for some P who knows the r used to encrypt C=E(x,r) to show V that x is the unique decryption of C by revealing r. P may know r either by having encrypted all the values used to compute C or by computing it via the decryption key $\phi$. To recover x, V computes $$x = \frac{(C \cdot r^{-n} \bmod n^2) - 1}{n}$$

P can recover random help r from C=E(x,r) by use of the private key $\phi$. Namely, $g^m \equiv (1+m*n) \pmod{n}$. Hence by E(x, r)=$(1+xn) \cdot r^n \pmod{n^2}$, $C \equiv r^n \pmod{n}$. Knowledge of $\phi$ and n implies knowledge of p and q. From $r^n \pmod{n}$ we directly obtain $R = r^n \pmod{p}$. Now gcd (n, p−1)=1 by the above assumption. Hence there exist readily computable integers A and B such that An+B(p−1)=1. Thus $R^A \equiv r \pmod{p}$, since $r^{B(p-1)} \equiv 1 \pmod{p}$, by Fermat. Similarly we compute r (mod q). Finally the help value r<n is computed by Chinese remaindering.

Uniqueness of Encryptions

Paillier encryption constitutes a bijection from $(Z_n \times Z_n^*) \to Z_{n^2}^*$. Where $Z_n$ is the set of integers [0,n) and $Z_n^*$: the subset of $Z_n$ relatively prime to n. Thus any integer in $Z_{n^2}^*$ represents a single valid encryption of an integer $x \in Z_n$ with random help value $r \in Z_n^*$. Consequently, if C=E(x,r), $C \neq E(x', r')$ for any $x' \in Z_n$ and $r' \neq r$.

P can attempt to cheat by providing a different random help value r'. Using r' instead of r in $$x = \frac{(C \cdot r'^{-n} \bmod n^2) - 1}{n}$$

will yield a different but invalid "decryption" x'. V must therefore verify the provided value r' is consistent with the known encryption C. This is done by re-encrypting the derived value x' as C'=E(x',r') and rejecting r' unless C'=C.

Mathematical Operations on Encrypted Values

The following definitions apply to any values encrypted as above, such as bids, deposit amounts, or desired quantities. These properties are due to the homomorphic properties of Paillier's encryption scheme. In these definitions we refer to a prover P who has the decryption key or all random help values for encrypted data, (generally the auctioneer), and a verifier V who does not.

Addition. Addition of two encrypted values:

$$E(x) \cdot E(y) = E(x+y) \pmod{n^2}$$

Adding a constant k to an encrypted value x is easily done by encrypting k with the random help value 1 and multiplying the two encryptions.

$$E(x) \cdot (1+kn) = E(x+k) \pmod{n^2}$$

Multiplication or division by a constant. Division is only possible when k is invertible mod $n^2$.

$$(E(x))^k = E(x \cdot k) \pmod{n^2}$$

$$(E(x))^{1/k} = E(x/k) \pmod{n^2}$$

Negation. Implied by multiplication by a constant.

$$(E(x))^{-1} = E(-x) \pmod{n^2}$$

Comparison to a constant k. P can prove any encryption C=E(k,r) is an encryption of k by revealing the help value r used to encrypt C. V then verifies that $(1+nk)r^n \equiv C \pmod{n^2}$, because $$E(k,r) = (1+n)^k \cdot r^n \pmod{n^2}$$

This is of particular interest when k=0. We remark that no encryption of a value other than zero is an $n^{th}$ residue mod $n^2$. To say that x is an $n^{th}$ residue (mod m) means that there exists some value g such that $x \equiv g^n \pmod{m}$ Equality comparison. Given two ciphertexts $C_1 = E(x_1, r_1)$ and $C_2 = E(x_2, r_2)$, P can prove $x_1 = x_2$ without revealing any additional information—most importantly, the value of $x_1$ or $x_2$. Both P and V compute $C' = C_1 \cdot C_2^{-1} \pmod{n^2} = E(x_1 - x_2, r_1/r_2) = E(0, r_1/r_2)$. P then proves C' is an encryption of zero as above by revealing $r_1/r_2$.

Inequality comparison. Given two ciphertexts $C_x = E(x)$ and $C_y = E(y)$, P can show x>y and $x \geq y$. Because our values x and y are integers mod $n^2$, we can prove x>y by showing $x \geq y+1$, provided $y \neq n-1$. Due to the homomorphic properties of Paillier encryption, $E(x+1) = E(x) \cdot (n+1) \pmod{n^2}$, and so adding 1 to a value in its encrypted form is trivial. Thus, all ordering comparisons can be reduced to the ability to prove $x \geq y$. We first specify that x and y must be in the range $[0, 2^t)$ for $2^t < n/2$. Then, to prove $x \geq y$, both P and V calculate $E(x-y) = E(x) \cdot E(y)^{-1} \pmod{n^2}$, and P proves $0 \leq (x-y) < 2^t < n/2$ from E(x−y). If in fact x<y, then (x−y) will wrap around mod $n^2$ so that $(x-y) \geq n/2$ and no such proof is possible.

Proof of multiplication of two values. Because Paillier encryption does not enable the secrecy-preserving multiplication of two encrypted values as it does addition, we require a method that allows a prover P with three plaintexts u, v, and w such that uv=w (mod n) to prove this fact to a verifier V who has Paillier encryptions E(u), E(v), and E(w), respectively. The solution we present is in the spirit of our other cryptographic primitives.

Definition A Multiplication Test Set (MTS) for E(u,r), E(v,s), and E(w,t) is $$\begin{cases} E(u_1, r_1), E(u_2, r_2), & \text{where } u = u_1 + u_2 \pmod{n} \\ E(v_1, s_1), E(v_2, s_2), & \text{where } v = v_1 + v_2 \pmod{n} \\ E(w_{i,j}) = E(u_i v_j, p_{i,j}), & \text{for } i, j \in \{1, 2\} \end{cases}$$

In each MTS, $u_1$ and $v_1$ are chosen uniformly at random from Z; $u_2$ and $v_2$ are correspondingly defined, as above, so that $u = u_1 + u_2 \pmod{n}$ and likewise for v.

Clearly, if given encryptions as in MTS and $$w_{1,1} + w_{1,2} + w_{2,1} + w_{2,2} = w \pmod{n}$$

then in fact uv=w (mod n). But for P to prove and for V to verify all the relationships included in the MTS entails revealing $u_1$, $u_2$, $v_1$, and $v_2$, consequently revealing u and v. Thus we adopt for an interactive proof the following challenge and partial revelation proof. P constructs and sends MTS. V randomly chooses a challenge pair (i, j), say, (1,2), and sends it to P. In this case, P reveals $r_1$, $s_2$, and $p_{1,2}$. This allows V to decrypt $E(u_1)$, $E(v_2)$, and $E(w_{1,2})$, and directly verify that $u_1 \cdot v_2 \equiv w_{1,2} \pmod{n}$. P further reveals:

$$R = r_1 \cdot r_2 \cdot r \cdot r^{-1} \pmod{n}$$

$$S = s_1 \cdot s_2 \cdot s^{-1} \pmod{n}$$

$$p = p_{1,1} \cdot p_{1,2} \cdot p_{2,1} \cdot p_{2,2} \cdot t^{-1} \pmod{n}$$

V by use of R verifies $E(u_1) \cdot E(u_2) \cdot E(u)^{-1} \pmod{n^2} = E(0, R)$, i.e., verifies $u = u_1 + u_2 \pmod{n}$ and similarly $v = v_1 + v_2 \pmod{n}$ via S. Finally, V verifies $E(w_{1,1}) \cdot E(w_{1,2}) \cdot E(w_{2,1}) \cdot E(w_{2,2}) \cdot t^{-1} \pmod{n^2} = E(0, p)$, thereby verifying that $w_{1,1} + w_{1,2} + w_{2,1} + w_{2,2} = w \pmod{n}$ holds.

A moment's thought reveals that if MTS was not proper then the probability of V uncovering this by the random choice of (i,j) is at least $$\frac{1}{4}.$$

Thus the probability of P meeting meeting the challenge when uv≠w (mod n) is at most $$\frac{3}{4}.$$

This implies that if m MTS's are used and P meets all m random challenges then the probability of P cheating is smaller than $$\left(\frac{3}{4}\right)^m.$$

In practice, the auctioneer will act as P and verify the multiplications required to prove the validity of multi-item auction allocations by repeating these zero-knowledge proofs until the desired likelihood of error is achieved.

As described above, Paillier's is a homomorphic encryption system, in which the result of an operation applied to two ciphertexts is a valid encryption of an operation (possibly the same one) applied to their plaintexts. Homomorphic encryption schemes enable computation over the hidden values without revealing either the values themselves or the results of the computation without proper decryption. Paillier's system employs a public/private key pair, n and φ respectively. The public encryption key n is the product of two large prime numbers p and q, and its size is determined by the security requirements of the application. The private decryption key φ is the product (p−1)(q−1). A 1024-bit key is widely considered sufficient for security until 2010. Paillier encryption is also a "probabilistic encryption" scheme. Encryptions are performed with a random "help value" r that is used to achieve semantic security: given two plaintexts and two encryptions of them, one cannot tell which encryption belongs to which plaintext without being able to decrypt them. Semantic security is critical for our test set mechanism to preserve the secrecy of the bids. The encryption of a message x will typically be denoted E(x,r), where the public key n is implicit and the help value r is made explicit. In discussion below, the help value will sometimes be dropped to simplify notation, e.g. E(x). Paillier's encryption scheme may be used to encrypt a bid as a step in an exemplary flow of a verifiably correct auction, as shown in FIG. 2, at 204.

We present here a summary of the properties of and extensions to Paillier's scheme we use in this paper. First, given only the encryption $E(x_1)$ and either another encryption $E(x_2)$ or a constant k, anyone can compute the encryptions $E(x_1+x_2)$, $E(x_1+k)$ and $E(x_1 \cdot k)$ without learning anything about $x_1$, $x_2$, or φ. Second, given three encryptions $E(x_1)$, $E(x_2)$, and $E(x_3)$, it is possible to prove in a zero-knowledge style that $x_1=x_2 \times x_3$. Third, based on these properties and the following Range-of-Values tests, we can also prove a full set of inequality operations for two encrypted values $E(x_1)$ and $E(x_2)$, e.g., $x_1=x_2$, $x_1>x_2$, etc., again, without revealing anything about $x_1$ or $x_2$. It is also possible to compare encrypted bids to constants in a similar way. We employ the notation $E(x) \leq E(y)$ to mean "x≤y can be proven using encrypted values E(x) and E(y)" and the similar notation $\geq(\geqq)$, $\triangleleft(<)$, and $\triangleright(>)$.

Verifiable and Confidential Range-of-Values Tests

According to one aspect of the invention, given ciphertext C=E(x,r) we need to prove that $x<2^t$ for some t such that $2^t<n/2$. That is, we want to be able to verify that a bid $Bid_i$ is smaller than some agreed upon bound $2^t$, without revealing any information about $Bid_i$. In one embodiment, this is used to prevent bids that, possibly in collusion with the auctioneer, create a wraparound mod n. The value of t determines the number of bits of resolution available to bidders in selecting their bids. For our purposes it suffices to take t=34, so that if bids are in units of one thousand dollars, for example, then bids are limited to at most $16 trillion. According to one aspect of the invention, we perform the test as follows:

Definition 1 A valid test set TS for the assertion "C=E(x,r) is an encryption of a number $x<2^t<n/2$" is a set of 2t encryptions:

$$TS=\{G_1=E(u_1,s_1),\ldots,G_{2t}=E(u_{2t},s_{2t})\} \quad (1)$$

where each of the powers of 2: 1, 2, ..., $2^{t-1}$ appears among the $u_i$ exactly once and the remaining t values $u_j$ are all 0.

By use of a test set TS, the prover P can prove that $x<2^t<n$ as follows:

Range Protocol. Let $x=2^{t_1}+\ldots+2^{t_l}$ be the representation of m, a sum of distinct powers of 2. AU selects from TS the encryptions $G_{j1},\ldots,G_{jl}$ of $2^{t_1},\ldots,2^{t_l}$, and further t−l encryptions $G_{j(l+1)},\ldots,G_{jt}$ of 0.

Note that:

$$(E(x,r)^{-1} \cdot G_{j1} \cdot \ldots \cdot G_{jt})(\bmod\ n^2)=E(0,s) \quad (2)$$

is an encryption of 0 with help value $s=(r^{-1} \cdot s_{j1} \cdot \ldots \cdot s_{jt})$ (mod n) if and only if indeed $x=2^{t_1}+\ldots+2^{t_l}$ and the $G_{jh}$ were chosen as stated. Now since AU has the decryption key φ and thus knows the help value r, then he can hand over to V the set $\{G_{j1},\ldots,G_{jt}\}$ and the above help value s. V can now verify on her own that (2) holds and deduce that $x<2^t<n/2$.

The above protocol reveals nothing to V beyond $x<2^t<n/2$, because TS is a set, in actual implementation a randomly permuted array of the elements in question. Consequently V has no information about which encryptions of powers of 2 are included in $\{G_{j1},\ldots,G_{jt}\}$. Furthermore, the inclusions of t−l encryptions of 0 hides even the number of non-zero bits in the binary representation of m. Finally, the inclusion of random factors $s_{j1},\ldots,s_{jt}$ in the computation of the help value s completely masks any information about the help value r in the encryption E(x,r). Consequently no information about x is revealed. In one embodiment, the verification occurs after the close of bidding, for example the conclusion of step 120, in FIG. 1.

There is, however, a problem with the above protocol in that V does not know that AU has presented her with a true test set. According to another aspect of the invention, this is overcome as follows. For ease of understanding we first describe an interactive verification protocol, then modifying it for non-interactive use. In one embodiment, the idea is to use a "cut and choose" procedure in which the prover commits to a number of test sets and allows the verifier to choose and inspect multiple test sets and make sure that they are each valid. Finally, the remaining test sets are all used to complete the proof. An early, possibly the first, use of this idea was presented by Rabin.

Yet another aspect of the invention provides Tamper Proof Interactive Verification of $x<2^t<n/2$. First, the prover P creates 2v, say for v=20, test sets $TS_1,\ldots,TS_{2v}$, and presents those to V claiming that they are all valid. Verifier V randomly selects v test sets $TS_{i1},\ldots,TS_{iv}$ and requests that P reveal all the encryptions by revealing all the corresponding help values. V verifies all the encryptions and checks that every $TS_{jh}$ is valid. If any verification fails, the process is aborted. Otherwise, there now remain v unexamined test sets, call them $TS_{j_1}, \ldots, TS_{j_v}$. P now completes v repetitions of the above Range Protocol, and establishes that $x<2^t<n/2$ by use of each of the above remaining v test sets. If all verifications succeed then V accepts that indeed $x<2^t<n/2$.

The only way that P can cheat is if all the above remaining v test sets are invalid, which requires that initially the 2v test sets comprised v proper test sets and v improper ones and, furthermore, when examining the test sets, V randomly chose all the v proper ones. The probability of such an unfortuitous choice is $$\binom{2v}{v}^{-1}.$$

In our example of v=20, that probability is, by Sterling's Theorem, about $$\sqrt{\frac{20\pi}{2^{40}}} < \frac{8}{10^{12}}.$$

Thus, we have a zero-knowledge protocol for V to verify interactively with AU that $x<2^t<n/2$, when given a ciphertext $E(x,r)$ such that the inequality actually holds.

Another aspect of the present invention provides for Tamper Proof Non-Interactive Verification of $x<2^t<n/2$.

In one embodiment, we adopt the following non-interactive method to establish the validity of test sets in our scheme. In what follows, we adopt the auctioneer AU as the prover as an illustrative embodiment. Suppose that there are range-of-values tests to perform. On closing the auction but before receiving information about bids, AU posts 4 kv test sets on the bulletin board. (For expository convenience, we proceed below with our assumption of v=20)

Prior to closing, each bidder, the seller (if necessary), and the auctioneer are also asked to commit to a random string of length M bits, which will be revealed after the auction closes and after the auctioneer commits to test sets. Given strings $S_i$ from each bidder i, $S_S$ from the seller, and $S_{Au}$ from the auctioneer, the strings are XORed together to generate $X = S_1 \oplus S_2 \oplus \ldots \oplus S_k \oplus S_S \oplus S_{AU}$. Note that even if only one of the participants chose his string randomly and independently, then X is a truly random string. In a certain embodiment, for security, it is important that any test sets to be used are posted with a specific initial order, and the auctioneer commits to $S_{AU}$, before the auctioneer receives these random strings $S_i$. One embodiment is shown by way of illustration in process 700, of FIG. 7, where the auction operator may commit to $S_{AU}$ at step 710 before bidders submit their random strings at 712, discussed in greater detail infra.

The 80 k test sets posted on the Bulletin Board are then segmented into 2 k groups of 40 test sets each, i.e., the first 40 test sets, the next 40 test sets, etc. The random bit-string X is then used, in combination with a fixed rule available to all participants and posted at the start of the auction to the bulletin board, to select 20 test sets from each group. This random selection replaces the random selection by the verifier V employed in the interactive proof and allows the proof to work without interaction. Below, we illustrate an accelerated version of this non-interactive verification, that we refer to as bulk verification. According to one aspect of the invention, bulk verification verifies all the test sets used in the auction en masse and economizes on the number of random sets that must be checked.

Bulk Verification of Test Sets

We have already shown how AU can use a test set to prove both that for any encrypted bids $E(Bid_1)$ and $E(Bid_2)$, $\{Bid_1, Bid_2\} \leq 2^t$ and $Bid_1 > Bid_2$, provided $2^t < n/2$. However, the verifier V needs to know that the test set AU uses to prove this is correctly constructed in order to believe the proof.

In a traditional zero-knowledge proof (ZKP) setting, AU would present V with several test sets in a "cut-and-choose" protocol, and V would then select at V's own discretion some of the testsets for AU to reveal. In our setting, it is impractical for AU to perform real-time ZKP's of bid correctness to all of the verifiers. Therefore, we employ a technique where instead of the verifier choosing the test sets to reveal, we derive randomness from the test sets themselves and use that randomness to define both which test sets will be revealed, and the order in which other test sets will be used to verify bids. This means that AU can publish a ZKP of the correctness of the test sets that anyone can verify. This can even be done asynchronously, i.e. the test sets used to prove an auction correct can be verified correct before an auction closes.

In single-item auctions with B bidders, AU will verify B bids and B−1 comparisons to prove the correctness of the auction. These auctions may require 2B−1 proofs.

We observe that all of the test sets will be of identical form for such an auction. Each test set will contain t encryptions of powers of 2: $2^0, \ldots, 2^{t-1}$, and t encryptions of 0. For visual comfort, we will use examples where t=32, accommodating bids in a range of over 4 billion values. Because any bid or comparison of bids can be verified using such a test set, we will prepare a single very large collection of test sets that will be used for all comparisons in an auction.

We demonstrate with very high probability that for collections of sufficient size, after revealing 20% of the collection, no more than 10% of the remaining unrevealed test sets are improper. Assuming we draw from the remaining test sets uniformly at random, the probability of a correctness proof of s succeeding, i.e., all s sets are improper is $<10^{-s}$.

If we select and reveal 500 test sets uniformly at random in a collection of 2500, the probability that all 500 will be correct and 200 (or more) of the remaining 2000 are incorrect is $<7 \times 10^{-19}$. We can then prove correctness of each bid or comparison with probability of error $<10^{-10}$ by drawing 10 of the remaining 2000 test sets uniformly at random and proving correctness on each of them. These numbers are appropriate for an auction with 100 bidders and moderate security requirements.

We can achieve a reasonable "random" ordering from the test sets using the random data string X constructed from the XOR of the values $S_1, \ldots, S_k$ from the bidders, $S_{AU}$ from the auctioneer, and optionally $S_S$ from the seller. We will call R some predefined substring of X of suitable length for this purpose.

An alternative method of constructing R uses some cryptographic hash function H applied to the test set data itself. Rather than having each participant contribute random data, AU will generate the complete set of encrypted test sets and publish them. Then, using a predefined hashing mechanism published at the beginning of the auction, AU constructs a string R of random data by hashing the encrypted values. This method should be difficult for AU to cheat by constructing a collection of test sets that yield an R such that AU can select which test sets are to be revealed. One such method is described below as construction of random data via hashing.

Figure 6:
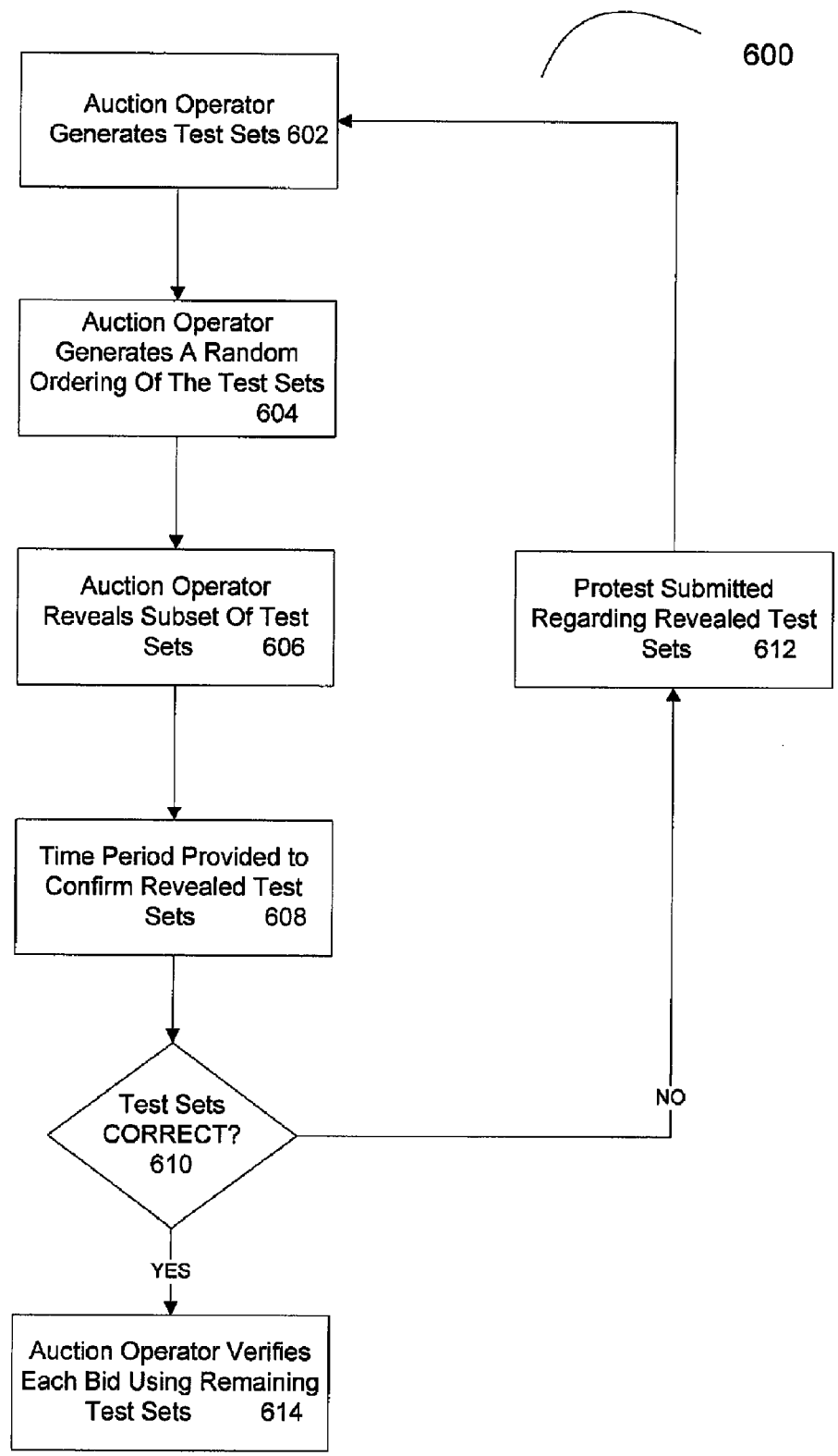
FIG. 6 is a flow chart of a process for verifying each bid submitted during the course of a verifiably correct auction.

Process 600, FIG. 6, illustrates the flow of a verification process used in one embodiment of the invention.

According to one embodiment, an auction operator generates test sets at 602. The auction operator then randomly orders the test sets at 604. The random ordering may occur according the various aspects of the invention as discussed. At 606, the auction operator reveals a subset of the generated test sets. A defined time period is provided to confirm that the revealed test sets are valid, at 608. If the time period elapses without protest the test set can be assumed valid at 610 (yes), also if the test set are confirmed valid the process also proceeds according to 610 (yes). If the all of the revealed test sets do not pass, 610 (no), a protest is submitted and the process begins again at step 602 with the auction operator generating test sets. If the test sets are confirmed valid, at 610 (yes), the auction operator verifies each bid using the remaining (unrevealed) test sets at 614.

Step 1. AU privately creates 2500 test sets $TS_i, i \in [0,2499]$, each of which is comprised of encryptions of 64 small values, $\{c_{i0}, \ldots, c_{i63}\} = \{E(0) \times 32, E(2^0), \ldots, E(2^{31})\}$. AU creates a secret random permutation $\pi_i(0 \ldots 63) \in \{0 \ldots 63\}$ for each $TS_i$ for each of the encrypted values in the test set and privately stores the plaintexts, random help values r and exponentiations thereof $r^n$ (mod $n^2$). In one example, step 1 is performed at 602.

Step 2. AU creates a permutation $\rho(0 \ldots 2499) \in \{0 \ldots 2499\}$ of an ordering of the 2500 test sets using the random data in R according to the protocol published at the beginning of the auction. One easily implemented method is to interpret each 16-byte sequence as a "short" integer and computing that number modulo 2,500 to obtain an index of one of the test sets. To ensure uniform probability over all test sets, we ignore values $\geq 65{,}000$, i.e., the largest multiple of the collection size 2,500 less than $2^{16}$. Other more bit-efficient methods are possible, but we use this method for its simplicity and clarity. In one example, step 2 is performed at 604.

One example of such a method is using a sliding window across R of 12 bits, beginning at the last 12 bits and working backward. Let $i = |R| - 12$, and $j = 0$, the current input we are defining for $\rho$. If for the value in the window $x = \text{int}(b_i b_{i+1} \ldots b_{i+11})$, $x < 2500$ and $\forall j' < j, \rho(j') \neq x$, i.e. x is not yet in our permutation, we define $\rho(j) = x$ and set $j = j+1$ and $i = i - 12$. If x does not meet these tests, we move i back one: $i = i - 1$.

Step 3. AU reveals the first 500 test sets defined by the ordering $\rho$. Verifiers will be given a reasonable specified time (depending on the size and complexity of the auction) to verify the correctness of these test sets, after which the test sets will be deemed correct if no objections are raised with AU or the notaries. If a test set is discovered to be invalid, the AU creates 2500 new test sets and the protocol is begun anew at Step 1. In one example, step 3 is performed at 606-612. In one embodiment, the test sets are determined valid 610 (yes), in another embodiment the test sets are discovered invalid, 610 (no). In one example, protests are submitted at 612, and the auction operator will generate test sets again at 602.

Step 4. If all 500 test sets are correct, then $\rho$ (excluding the revealed test sets) defines the random ordering of the unrevealed test sets that are used to prove each bid. In one example step 4, occurs at 614.

Once the bids have been published on the bulletin board by the auctioneer in a strict ordering where AU claims, w.l.o.g., $\forall i < j$, $Bid_i \geq Bid_j$, then each bid $Bid_i$, $1 \leq i \leq B$ is verified for correctness by the next 10 unused test sets in the collection in the order defined by $\rho$. Following that, the comparisons $Bid_i \geq Bid_{i+1}$ are proven, again by using each successive set of 10 unused test sets from the ordering defined by $\rho$.

Construction of Random Data via Hashing

According to another aspect of the invention, we can achieve a reasonable "random" ordering from the test sets using deterministic hashing functions such as SHA-256. Our method follows:

Step 1. AU has privately created 2500 test sets $TS_i, i \in [0, 2499]$, each of which is comprised of encryptions of 64 small values, $\{c_{i0}, \ldots, c_{i63}\} = \{E(0) \times 32, E(2^0), \ldots, E(2^{31})\}$. AU creates a random permutation $\pi_i(0 \ldots 63) \in \{0 \ldots 63\}$ for each $TS_i$ for each of the encrypted values in the test set and privately stores the plaintexts, random help values r and exponentiations thereof $r^n$ (mod $n^2$).

Step 2. AU creates a 128-bit null seed value $S_0 = \{0\}^{128}$. For each test set $TS_i, 0 \leq i < 2500$, AU then orders all of the ciphertexts according to $\pi_i$ and concatenates one ciphertext from each test set, then hashes the result into a 256-bit value (indices i are mod 2500):

$$b_0 \ldots b_{255} = H(S_i \| c_{i\pi_i(0)} \| c_{(i+1)\pi_{(i+1)}(1)} \| c_{(i+2)\pi_{(i+2)}(2)} \| \cdots \| c_{(i+2499)\pi_{(i+2499)}(3)})$$

and stores half of the value in a result accumulator: $R_{i+1} = R_i \| b_0 \ldots b_{127}$. AU uses the other half for "chaining" to make the next hash dependent on past information: $S_{i+1} = b_{128} \ldots b_{255}$. At the end of this process, AU has 320,128 bits of randomness derived from the chained hashing operation by setting $R = R_{2500} \| S_{2500}$. (The final seed is never used for hashing.)

Step 3. AU, beginning at the end of the result accumulator R and working backward, creates a permutation $\rho(0 \ldots 2499) \in [0, 2499]$ of the indices of the test sets as described above.

Step 4. AU reveals the first 250 test sets defined by the ordering $\rho$.

Step 5. AU re-orders all the test sets according to $\rho$ and repeats the hashing process from Step 2 to obtain a new result R and a new permutation $\rho'$.

Step 6. AU reveals the first test sets defined by the ordering $\rho'$ until a total of 500 (including the first 250 under $\rho$) have been revealed.

Step 7. If all 500 test sets are correct, then $\rho'$ (excluding the revealed test sets) defines the random ordering of the unrevealed test sets that are used to prove each bid, as $\rho$ as discussed previously. In one example, steps 1-7 are executed as part of process 600 for verifying bids. In another example, steps 1-7 are executed as part of a process 700, for proving the outcome of a verifiably correct auction.

In our process and system, we represent the encryptions $c_{ij}$ as ASCII base 10 string representations of the underlying values, and seed values $S_i$ as ASCII hexadecimal representation of the underlying values with the first bytes of $S_i$ first in the string. This is to eliminate potential big/little-endian compatibility issues or binary representations in XML.

Once the bids have been published on the bulletin board by the auctioneer in a strict ordering where AU claims, w.l.o.g., $\forall i < j$, $Bid_i \geq Bid_j$, then each bid $Bid_i, 1 \leq i \leq B$ is verified for correctness by the next 10 unused test sets from $\rho'$'s permutation of the collection. Following that, the comparisons $Bid_i \geq Bid_{i+1}$ are proven, again by using the next 10 unused test sets from the ordering defined by $\rho'$.

The double-hashing of the test sets, once based on the order provided by the AU, and the second time based on a random order derived from the first hash, yields a highly secure method of choosing which test sets to reveal, and a suitable random ordering for selecting the test sets for correctness proofs that justifies our above probability estimates of error. Cheating would require an enormous search to construct a test set collection whose hash gave all proper test sets and a permutation such that the same data rehashed also yielded proper test sets, and an ordering that placed the improper test sets in exactly the right place to enable cheating.

Single-Item Auctions

Given the above cryptographic tools, in one embodiment we can formulate a single-item auction succinctly. We assume that the bidders $B_1, \ldots, B_k$ are known entities with publicly known digital signatures $Sign_i$. We further assume that the winner and her payment depend only on the ordering of the bids and that the payment is one of the bids. This class of auctions include first-price and second-price auctions, and also allows for auctions with reservation prices by a simple extension in which the seller also submits a bid.

Exemplary Protocol

Step 1. AU posts the following information on the bulletin board: the terms of the auction specifying the item, the mechanism for selection of the winner, the deadline T, an identifier ID of the auction, and a Paillier encryption key n. AU knows the corresponding decryption key $\phi$. If desired, the auctioneer may post an encryption E(RP) of a reserve price RP defined by the seller. The auctioneer also posts information about the notaries that are to be used for the auction. He posts the cryptographic hash function H to be used by all participants in constructing their commitments. Finally, the auctioneer defines the method that will be used for extracting a random permutation of test set indices from a random string to be used when proving the correctness of the auction.

We emphasize that all of the above data $D_{AU}$ is posted on the bulletin board, accompanied by AU's signature $Sign_{AU}$ ($D_{AU}$). In one embodiment, step 1 occurs as part of process 100, at 102.

Step 2. Every $B_i$ chooses a bid $Bid_i$. She encrypts it as $C_i=E(Bid_i,r_i)$ using the public key n and a randomly chosen help value $r_i$. In order to create efficient test sets to prove bid sizes, we restrict the size of the bid so that $Bid_i<2^t<n/2$ for small t, say, t=34. Every $B_i$ also generates a random bit string $S_i$ of length M which is used in the proof. Bidder $B_i$ then commits to $C_i$ and $S_i$ by using the hash function, to form a single commitment string $Com_i=[H(C_i),H(S_i),ID]$, which also includes the identifier ID of the auction. Finally, the bidder signs this commitment, and sends $Sign_i(Com_i)$ to AU and her notaries, if used, before time T. AU returns a signed receipt $R_i=Sign_{AU}([Com_i,ID,T])$.

Note that hiding of the encrypted bids and of the random strings by use of the hash function H prevents anyone from gaining any knowledge of the data prior to time T. In particular, neither the notaries nor the auctioneer have any meaningful information. In one example step 2 is implemented as a flow shown by steps 104, 106, 108, and 110 of FIG. 1.

Step 3. At time T, the AU posts all the received commitments $Com_i, \ldots, Com_k$ on the bulletin board, as well as a random bit string SA U of length M. AU also creates a number of test sets $TS_1, TS_2, \ldots, TS_K$, where K is a multiple of k, e.g., K=80 k. He signs and posts the test sets on the bulletin board. In one example step 3 occurs at 112. Highlighting the steps required to prove the result of the auction, process 700, shown in greater detail an embodiment where an auction operator posts bid commitments at 704, generates a random value at 706, generates test sets at 708, and digitally signs and posts them at 710.

Step 4. Between time T and T+1 any Bidder $B_i$ who has a receipt $R_i$ for a bid which is not posted, can appeal her non-inclusion, resorting to her notaries if she has used them. In another example, appealing non-inclusion may also occur prior to the end of bidding, as shown in step 114 (no), 116, and 118.

Step 5. After time T+1, every $B_i$ sends to AU her encrypted bid $C_i=E(Bid_i,r_i)$ as well as her random string $S_i$. After time T+1, AU posts the encrypted bids, $C_1, \ldots, C_k$, and the random strings, $S_1, \ldots, S_k$, on the bulletin board. Every Bidder $B_1$ can verify, for any bidder $B_j$, that the posted value $Com_j$ corresponds to the ciphertext $C_j$ and the random data string $S_j$. In case of discrepancies she protests. This check can be performed simply by computing $H(C_j)$, $H(S_j)$, and checking the digital signature $Sign_j(H(C_j),H(S_j),ID)$. In one example step 5 occurs at 128 and 130 of process 100, FIG. 1.

To prevent AU from decrypting and observing some bids after time T before sending instructions to a favored bidder, e.g., to instruct the bidder not to unlock her bid, we summarize two illustrative solutions. In one embodiment, bidders who refuse to unlock their bids before time T+1 could be obligated to pay a large fine to a disinterested third party, such as one of the notaries in the auction. To prevent collusion, the auctioneer or seller may not receive the fine. Thus, with this view the notaries not only act on behalf of a bidder in providing a witness to ensure that their own bids are respected by the auctioneer, but notaries also act on behalf of a bidder in ensuring that other bidders must follow through and reveal bids to which they had earlier committed.

One preferred method (due to its simplicity) is to use delayed decryption key revelation services, D Pr KR. In one example, process 100 employs a delayed key revelation service at 122 (yes). For this, bidders must submit encryptions of their encrypted bids $E_{DR}(C_i)$ before time T+1 to be decrypted at time T+1. AU posts these on the bulletin board before time T+1, and at time T+1 both AU and verifiers can open them simultaneously to recover the encrypted bids $C_i$. In one embodiment, this occurs at 124, when the decryption key is published, and at 126, once published the decryption key permits access to bidders' encrypted bids.

Step 6. Using the, encryption key $\phi$, AU recovers the bids $Bid_1, \ldots, Bid_k$. The auctioneer then computes the winner of the auction, and the payment, according to the auction rules. In one example this occurs at 132. The auctioneer posts the winner's identity, $B_1$ and then information to define the payment to be made by the winner to the bulletin board. This information about payment can be posted in an encrypted form if the payment is to be kept private from non-winning bidders. Finally, the auctioneer also posts information that will enable any party to verify that the correct result was implemented. In one example, this occurs at 134. These include proofs of the correctness of the winner and payment, and proofs of the validity of each bid. In one example, the proofs enable anyone to verify the result of the auction at 136. Details on this step are provided next.

Verification

Figure 7:
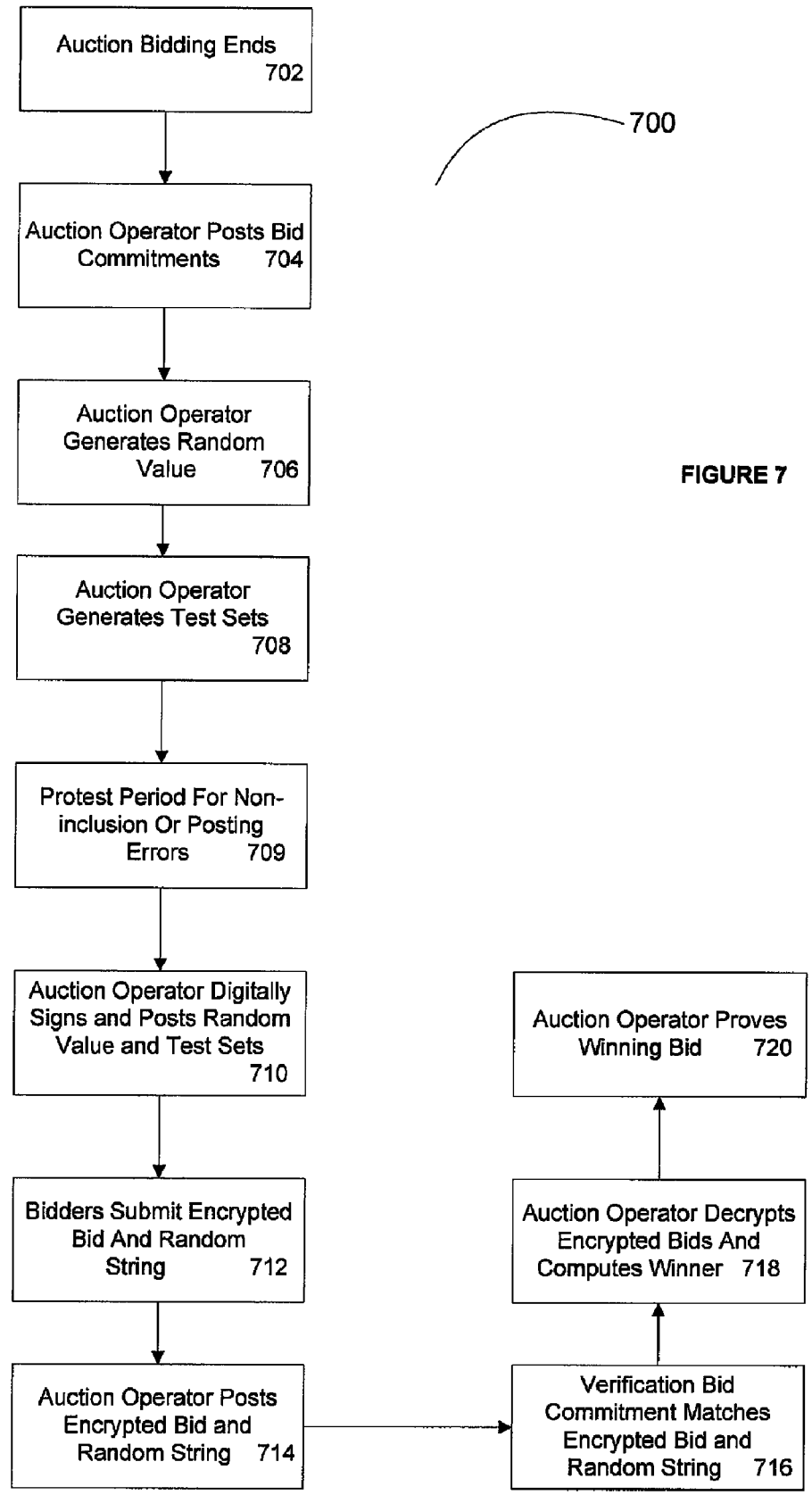
FIG. 7 is a flow chart of a process for proving the winning bid as part of a verifiably correct auction.

FIG. 7, shows an illustrative process 700, implemented as part of the overall flow of one embodiment of a verifiably correct auction. In process 700 highlights the steps that may be included in proving the outcome of a verifiably correct auction. At 702, the period for bidding on an auction ends. At 704, the auction operator posts submitted bid commitments. At 706, the auction operator generates a random value and generates test sets at 708 to be used in proving the outcome of the verifiably correct auction. At 709, the time period for protesting non-inclusion or for identifying errors in posted bid commitments elapses. At 710, the auction operator digitally signs and posts the generated random value and generates the test sets. It should be understood that bid commitments may be posted as they are received, and thus posted before the end of bidding on a particular auction. The protest period for errors or non-inclusion may begin prior to the close of bidding as well, or according to one embodiment open only after the close of bidding. Auction operator may generate test sets 708 before generating a random value 706. One skilled in the art should understanding that the illustrative process 700 is not necessarily limited to flow show as certain steps may be omitted or performed in a different order. According to one embodiment, the auction operator should commit to the generated random value, at 710, before bidders submit their random bit strings, at 712. Once the bidders submit their encrypted bids and random strings, at 712, the auction operator will post them, at 714. The posting of encrypted bids and the random bit strings allows verification that bid commitments match the encrypted bids and random strings, the verification occurs at 716. At 718, the auction operator will secretly decrypt the encrypted bids and compute the winner or winners of the auction, at 718. At 720, the auction operator proves the outcome of the auction. According to one embodiment, proof of the auction may include showing that a reserve price was met, and may include showing the winning bid(s) was the greatest. In another embodiment, the proof may include proving the correctness of payment required by the winner or winners. In one example, a Vickrey style auction is conducted in which the winner pays the amount bid by the second highest bidder, the auction operator may prove the correctness of this payment at 720.

One aspect of the method and apparatus of the invention is that any verifier V (including any of the bidders) can verify on her own that the winner and payment of the auction were determined according to the rules of the auction. This can be done in a "zero knowledge" fashion, that is, without revealing anything about the values of the bids except that implied by the outcome of the auction. In addition, the auctioneer can choose how much of the outcome is revealed. For example, the proof can validate that the payment was correctly determined but without revealing any information about the value of the payment itself if this is to be kept secret.

The class of single-item auctions under consideration (including first-price and second-price auctions) has the property that the winner and payment depend only on the ordering of the bids. In the case of a second price (or Vickrey) auction, the item is sold to the highest bidder but for the second highest price. This auction has useful theoretical properties: it is a dominant strategy for bidders to report their true willingness to pay, the auction is efficient, and Vickrey auctions with reservation prices are revenue maximizing in symmetric environments when the auctioneer has the same prior information about the value of each bidder before the auction. In the case of a first-price auction, the item is sold to the highest bidder for the highest price.

Take as an example the Vickrey auction and assume, without loss of generality, that AU announces that $B_1$ is the winning bidder, which is tantamount to the following set of $$\{Bid_1 > Bid_2; Bid_2 \geq Bid_3; \ldots; Bid_2 \geq Bid_k\} \quad (3)$$

Note that the encrypted values $$\{C_1, \ldots, C_k\} = \{E(Bid_1, r_1), \ldots, E(Bid_k, r_k)\} \quad (4)$$

were posted in Step 5 of the protocol. To prove the claims, it suffices to show that each $C_i$ is an encryption of a valid bid $0 \leq Bid_i < 2^t < n/2$, and that $$\{C_1 > C_2, C_2 \geq C_3, \ldots, C_2 \geq C_k\} \quad (5)$$

Verifier V verifies these 2 k−1 claims in a zero knowledge fashion using the tools described above, which enables verification of the winner, item allocation, and payment as described in the next paragraphs.

If a reserve price is used, AU also proves in a similar fashion that $Bid_1 \geq RP$.

Recall that the auctioneer had posted 2 k groups of 40 test sets in Step 3. He creates proofs for each of the first k claims using k of these groups of 40 test sets, one for each claim. He reveals all encryptions for the subgroup of 20 test sets determined by the random string X and the random method posted in Step 1 of the auction. With each of the 20 other test sets AU performs the computation described in Range Protocol and posts it on the bulletin board. V can verify that all the revealed test sets are valid, that their indices were chosen correctly, and that the k posted computations are of the form (2). This verifies the first k claims. In addition, AU posts proofs for the k−1 claims that $Bid_1 > Bid_2$ and $Bid_2 \geq Bid_i$, $2 < i \leq k$ by using k−1 groups of 40 additional test sets for each inequality using the methods described above.

This ordering of bids is used to verify the winner as the bidder with identity corresponding to submitted bid $E(Bid_1)$, and the item is allocated to this bidder. In a Vickrey auction, the payment to be made by the winner is $Bid_2$ and this can be proved by sending a verifier V the random help value $r_2$ from $B_2$'s encrypted bid $C_2 = E(Bid_2, r_2)$. V can then verify the correctness of the payment by re-encrypting $Bid_2$ with $r_2$ and checking the result is $C_2$.

Multi-Item Auctions

According to another aspect of the invention, verifiably correct auctions may be conducted for multiple identical items. In these auctions, the auctioneer has some number l of available identical items for sale. Real-life examples include large lots of refurbished items on eBay, or U.S. Treasury bills. As before, we will be able to implement a general class of auctions that includes the first-price, uniform-price, and second-price (generalized Vickrey) auctions. We choose to illustrate the framework for divisible bids, in which bidders are willing to accept any number of items up to a maximal limit and bid a price per item. We also assume that no winning bids are equal. However, there is nothing about the framework that is limited in this way, and a treatment of tied bids and extensions to "all-or-nothing" bids and "bid curves" can also be implemented.

Exemplary Protocol

Step 1. AU posts the auction information on the bulletin board. In addition, AU posts the total number of items available, l, and the maximum allocation to any one bidder (if any), $l_{max}$.

Step 2. Each participating bidder $B_i$ prepares two integer values ($Bid_i$, $Qty_i$) for each bid she wishes to submit to the auction, where $Bid_i$ is the amount that she will pay per item and $Qty_i$ is the maximum number of items desired by $B_i$. As above, $B_i$ also generates a random bit string $S_i$ and sends it to AU. $B_i$ then encrypts $Bid_i$ and $Qty_i$, using AU's public Paillier key n, as $E(Bid_i)$ and $E(Qty_i)$ and commits by sending AU and her notaries, if used, commitments $$Com_i = [H(E(Bid_i)), H(E(Qty_i)), H(S_i), ID], \quad (6)$$

and digital signature $Sign_i(Com_i)$. AU issues a receipt for these commitments and publishes them on the bulletin board in accordance with our standard protocol.

Step 3. As above, at time T AU posts received commitments, his random string $S_{AU}$, and test sets on the bulletin board. The number of test sets will depend on the type of the auction and the payment calculation as discussed further. In one example, bidding on the auction ends at step 702, after which the auction operator posts bid commitments at 704. In one example the auction operator generates a random value 706 and test sets 708 and posts both, after digitally signing them at 710.

Step 4. As above, bidders have between time T and T+1 to appeal non-inclusion, which may involve resorting to the commitments sent to any notaries. In one example, step 4 occurs at 709.

Step 5. As above, bidders reveal their encrypted bids and quantities E(Bid$_i$) and E(Qty$_i$), as well as their strings S$_i$, between time T and T+1, which AU publishes on the bulletin board. All bidders can check that the revealed values correspond with earlier commitments. In one example step 5 occurs at 712 where bidders submit encrypted bids and random strings, at 714 where the auction operator posts the encrypted bids and random strings, and at 716 where bid commitments can be verified as corresponding to the encrypted bids and the random strings.

Step 6. AU privately recovers bids Bid$_i$ and quantities Qty$_i$ using private key $\phi$, and uses the information to compute the correct outcome of the auction. In one example this occurs at 718. An important notion in a multi-item auction is that of the threshold bid index, $\alpha$. This is defined such that bidders B$_\alpha$, ..., B$_k$ do not receive any items. The sum of the quantities associated with winning bids Bid$_1$, ..., Bid$_{\alpha-1}$ is greater than or equal to the number of available items l, and this is not true for a smaller threshold index. Thus, all bidders B$_i$ such that i<$\alpha$ are winners. The threshold winner $\alpha-1$ may receive some subset of her total demand. Formally, threshold index $\alpha$ is defined so that:

$$\left[\sum_{i=1}^{\alpha-2} Qty_i < A\right] \wedge \left[\sum_{i=1}^{\alpha-1} Qty_i \geq A\right] \quad (7)$$

Note that we have assumed here that there are enough bidders to cover all of the supply. This can be handled without loss of generality, by also introducing a single dummy bid at zero price for all supply, l. In addition to determining, and thus the winners in the auction, AU also posts proofs of the identity of the winner(s) and their allocations on the bulletin board, as well as proofs of the validity of each bidder's bid and quantity. He also computes proofs of correctness of each winner B$_i$'s payment. If public verification of payments is required, AU posts these correctness proofs on the bulletin board, along with the random help values needed to decrypt the payments. If the payments are to remain secret, he publishes the proofs on the bulletin board but sends the random help values privately to each winner. In one example this occurs at 720.

Verification

The verification step in a multi-item auction is more complex than for the single item auction, but relies largely on the same cryptographic primitives used in the simpler single-item case. According to another aspect of the invention, each verification can be done in a zero knowledge fashion, revealing no information beyond that implied by the outcome of the auction.

As before, AU first publicly proves the minimum bid-ordering information, that all winning bids are strictly greater than the threshold bid Bid$_\alpha$, i.e., Bid$_i$>Bid$_{\alpha-1}$ for all i<$\alpha-1$ and Bid$_{\alpha-1}$>Bid$_j$ for all j$\geq\alpha$. This reveals only minimum public information about the value of the bids; the same information that is implied by the outcome. AU also proves that the values are valid and without wraparound. If used, AU proves that all winning bids met the reserve price, i.e. Bid$_i \geq$RP for all i<$\alpha$.

In addition, AU must also prove that the bidders' desired quantities were encrypted correctly, i.e., without wraparound, and less than l$_{max}$. We assume that l<$2^t$<n/2 for number of available items l and test set size parameter t. AU first proves that no bidder has submitted a quantity greater than a specified maximum allowed allocation l$_{max}\leq$l. To do this, AU first encrypts E(l,1) and E(l$_{max}$,1); a random help value 1 is used so that anyone can verify those encryptions. AU then proves E(Qty$_i$)$\trianglelefteq$E(l$_{max}$,1) for all 1$\leq$i$\leq$k. Next, AU can use encryptions of various sums of quantities to prove the correctness of the threshold bid index $\alpha$. In one example, verification of quantity occurs at 720 of FIG. 7. Paillier's homomorphic encryption system allows for a zero-knowledge proof that a ciphertext represents the encrypted value of the sum of two encrypted values; in particular, $\Pi_{i=1}^{\alpha-2}$E(QTy$_i$)=E($\Sigma_{i=1}^{\alpha-2}$ Qty$_i$). Given this, AU can establish:

$$\left\{E\left(\sum_{i=1}^{\alpha-2} Qty_i\right) \triangleleft E(l); E\left(\sum_{i=1}^{\alpha-1} Qty_i\right) \trianglerighteq E(l)\right\}, \quad (8)$$

as required.

In the event there are ties at the threshold, such that more than one bidder bid value Bid$_{\alpha-1}$, additional proofs can be used to determine that the allocation is fair. According to another aspect of the present invention, we use the auction's random data to define a publicly verifiable ordering $\pi$ of w equal bidders, $\pi(1 \ldots w)\in\{1 \ldots k\}$. Depending on the rules of the auction, B$_{\pi(1)}$ and following bidders will receive up to their full allocations until the items are exhausted, or the items will be distributed one by one in a "round robin" fashion to the bidders in the order defined by $\pi$. We present one embodiment of a method of verifying the correctness of a round robin allocation; in this method we use l$_i$ to notate the allocation to bidder B$_i$.

Step 1. Prove that the allocations to all bidders add to l, i.e. $\Sigma_{i=1}^k$l$_i$=l.

Step 2. Given ordering $\pi$ of threshold bidders, compute j such that B$_{\pi(j)}$ is the first bidder in the ordering to receive a partial allocation. Compute h such that B$_{\pi(h)}$ is the first bidder in the ordering to receive l$_{\pi(j)}$-1 items, i.e. the next bidder in line when the items ran out. If no such h exists, set h=w+1.

Step 3. Prove that all allocations were fair as follows:

3a. For 1$\leq$i<j, prove l$_{\pi(i)}$=Qty$_{\pi(i)}$ and l$_{\pi(i)}$<l$_{\pi(j)}$.

3b. For j<i<h, prove either that l$_{\pi(i)}$=l$_{\pi(j)}$, or both l$_{\pi(i)}$=Qty$_{\pi(i)}$ and l$_{\pi(i)}$<l$_{\pi(j)}$.

3c. For h$\leq$i$\leq$w, prove that l$_{\pi(i)}$=(l$_{\pi(j)}$-1), or both l$_{\pi(i)}$=Qty$_{\pi(i)}$ and l$_{\pi(i)}$<l$_{\pi(j)}$.

In a certain embodiment, we show that bidders either received their entire allocation or at most one fewer than the first bidder in line to receive a partial allocation, and that the ordering of the partial allocations is proper. In one example, proof of correctness of the round robin allocation occurs at part of process 700 at 720.

Payment

In one embodiment of a first-price auction, the auctioneer can finally prove a payment to a third party by revealing B$_i$'s bid Bid$_i$ together with the bidder's help value. A verifier can simply check that the bid value corresponds with the encrypted value submitted by the bidder. Similarly, in a uniform-price auction, whereby every bidder pays the bid price of the losing threshold bidder B$_{\alpha-1}$, then AU can provide a public proof by revealing Bid$_{\alpha-1}$ together with the help value used by B$_{\alpha-1}$. The uniform price auction is an approximation to a Vickrey auction in this setting.

According to another aspect of the invention, we turn our attention to proving the correctness of prices in a generalized Vickrey auction, or Vickrey-Clarke-Groves (VCG) mechanism for this multi-item setting. In a VCG mechanism, the number of items are allocated according to the price bid, but the actual payment for each winner depends on others' bids. The Vickrey payment for bidder $B_i$ is defined as:

$$p_{vcg,i} = Qty_i^* \cdot Bid_i - [V(B) - V(B_{-i})], \quad (9)$$

where $V(B)$ is the total revenue in the auction with all bidders, $V(B_{-i})$ is the total revenue in the marginal economy with bidder $B_i$ removed, and $Qty_i^*$ denotes the quantity allocated to bidder i in the auction. This has a simple interpretation: a bidder's payment is determined as the greatest amount other (displaced) bidders would have paid for the same items had $B_i$ not been participating in the auction.

We use a proof to establish the correctness of this payment. Let $Qty_j^{-i}$ denote the quantity awarded to bidder $B_j$ in the marginal auction without bidder $B_i$. For a non-marginal winner, i.e., $i < \alpha - 1$, her VCG payment is:

$$Qty_i^* \cdot Bid_i - \left[ Qty_i^* \cdot Bid_i + \sum_{j \neq i, j \leq \alpha-1} Qty_i^* \cdot Bid_j \right] + \quad (10)$$

$$\sum_{j \neq i, j \leq \beta_i - 1} Qty_i^{-i} \cdot Bid_j = \left[ \sum_{\alpha-1 < j \leq \beta_i - 1} Qty_i^{-i} \cdot Bid_j \right] +$$

$$[Qty_{\alpha-1}^{-i} \cdot Bid_{\alpha-1} - Qty_{\alpha-1}^* \cdot Bid_{\alpha-1}]$$

For the marginal winner, $i = \alpha - 1$, her VCG payment is:

$$Qty_i^* \cdot Bid_i - \left[ Qty_i^* \cdot Bid_i + \sum_{j \neq i, j < \alpha - 1} Qty_i^* \cdot Bid_j \right] + \quad (11)$$

$$\sum_{j \neq i, j \leq \beta_i - 1} Qty_i^{-1} \cdot Bid_j = \sum_{\alpha-1 < j \leq \beta_i - 1} Qty_i^{-1} \cdot Bid_j$$

Thus, the VCG payment by bidder $B_i$ is a linear combination of the product of the bid price and allocated quantity to bidders displaced by bidder $B_i$ from the winning allocation. In the case of a non-marginal bidder, this computation also accounts for the effect on the allocation to bidder $\alpha - 1$.

Consider the following verifiable proof structure of one particular embodiment for the term $\Sigma_{\alpha-1<j\leq\beta_i-1} Qty_j^{-i} \cdot Bid_j$ that is common to both kinds of winners:

Step 1. In generating the proof, AU must first establish a bid ordering for the marginal auction without $B_i$, i.e., prove that $\beta_i$ is the correct threshold bid index by showing $Bid_j > Bid_{\beta_i-1}$ for $j \neq i, j < \beta_i - 1$ and $Bid_{\beta_i-1} > Bid_j$ for $j \geq \beta_i$, this can be done as in the main auction. Second, AU must prove that bidder $\beta_i - 1$ is the threshold winner in this auction, by proving the analogue to Eq. 7. Third, AU must publish encrypted values $Pay_j = Qty_j \cdot Bid_j$ for all $j > \alpha_i, j < \beta_i - 1$ (and similarly for the new marginal bidder, $Pay_{\beta_i-1} = Qty_{B_i-1}^{-i}$), and prove the correctness of all of these ciphertexts. This employs proofs of correct multiplication, as previously described. The proof of $Pay_{\beta_i-1}$ in turn requires a proof of the quantity allocated $Qty_{\beta_i-1}^{-i}$ to this bidder, via a proof that a published ciphertext is the encrypted value of $1 - \Sigma_{j \neq i, j < \beta_i-1} Qty_j$. Fourth, AU must publish the encrypted value of the sum of these payments and a proof of its correctness.

Step 2. A verifier V can independently compute the encrypted Vickrey payment as above and check the correctness of the proof.

Step 3. AU reveals the random help value in the resulting encrypted Vickrey payment to V, who decrypts using that value and verifies it is correct by re-encryption.

According to one aspect of the invention, the verifier V now knows that $B_i$'s Vickrey payment is correct knowing nothing more about any bidder's bid value than can be derived from the definition of Vickrey payments.

The additional term, $[Qty_{\alpha-1}^{-i} \cdot Bid_{\alpha-1} - Qty_{\alpha-1}^* \cdot Bid_{\alpha-1}]$ can be determined in the case that bidder i is the threshold winner and $i = \alpha - 1$ in an analogous fashion. Encrypted values of the allocation quantities received by bidder i in the main auction and in the marginal auction, i.e., $Qty_{\alpha-1}^*$ and $Qty_{\alpha-1}^{-i}$ can be established via subtraction from total items 1 of the total allocation to other bidders. Then, a ciphertext for the difference, $Qty_{\alpha-1}^{-i} - Qty_{\alpha-1}^*$ and then the product $(Qty_{\alpha-1}^{-i} - Qty_{\alpha-1}^*)Bid_{\alpha-1}$ can be published and proved.

Note that in general, the revelation of information about a Vickrey payment reveals some information about the bids submitted in the auction. For example, if the payment is determined as the result of a single displaced bid $B_\alpha$ then the payment demonstrates that the quantity requested by $B_\alpha$ is at least that of the winner $B_i$ in question and also reveals the per-item bid price of bidder $B_\alpha$. Of course, our auction technology reveals no more information than that implied by knowledge of the outcome of the auction, in this case the payments. (We observe that in the example presentation we have here, the verifier also learns the number of the other bidders whose information is combined to yield the Vickrey price. However, a simple use of our technology to add dummy bids, in other embodiments enables the more rigorous security claim.)

Security Deposits

Many auctions require an initial security deposit to participate in the auction that will be forfeited in the event a bidder refuses to enter a bid or wins and refuses to pay. In many cases, the deposit is a function of the maximum legal bid a bidder may submit, e.g. the deposit must be at least 10% of the bidder's bid. Because such deposits reveal information about a bidder's utility, bidders want the value of their deposits to remain as secret as the value of their bids. Our system easily accommodates such deposits.

We introduce the notion of a third party "deposit authority" D who accepts deposits or posts bonds for would-be bidders. In practice, there may be multiple deposit authorities, but this does not change our result. D is a publicly known, well respected entity such as a law firm or bank who acts as a guarantor of the bidders' deposits.

Before a bidder $P_i$ is allowed to submit a bid, she deposits $Dep_i$ with D. D then creates a Paillier encryption $E(Dep_i)$ using AU's public key n and a commitment of this encryption $Com_D E(Dep_i)$. D submits the commitment to AU, who issues a receipt and publishes it on the bulletin board.

When the auction closes, D reveals all of its commitments and the encrypted deposits $E(Dep_i)$ are published on the bulletin board. AU can now prove to anyone that $P_i$'s 10% deposit was acceptable via $$E(Dep_i)^{10} = E(Dep_i \cdot 10)$$

$$E(Dep_i \cdot 10) \geq E(Bid_i)$$

Illustrative Example

We implemented Paillier encryption and test set verification in C++ using the LiDIA number theory package on a commodity Linux workstation with a Pentium 4 2.8 GHz processor.

The greatest computational cost in our protocol is the construction and verification of test sets, and in particular the exponentiation of random help values (r″) required to encrypt or (verifiably) decrypt a value. This cost dominates all other computation; for example, for the auctioneer to sort one million bids $<2^{64}$ takes less than one second on our system. In a single-item auction, the auctioneer can prepare for an auction of 100 bidders in about two hours, and each verifier can independently verify the auctioneer's proofs of correctness in less than half an hour. Both preparation and verification scale linearly and are easily parallelized. Thus, with modest distributed computation, even a multi-item auction with ten thousand bidders can be prepared in a few hours and verified in reasonable time.

We present data for both 1024- and 2048-bit symmetric public encryption keys, which are considered safe until 2010 and 2030, respectively. Because the lifetime of a security key is based on the difficulty of breaking it on available computing power, we believe that, for the most part, an auction with "5-year" security at any point in time will take about the same amount of time as it does today, as improvements in computing power for breaking keys are likely to be comparable to those in encryption.

Table 1 shows the time it takes to compute various cryptographic operations on our test machine. We observe that the time required to prepare or verify a test set is essentially that required by the encryption and decryption. All test sets represent $2^{34}$ discrete values.

TABLE 1

Time to perform basic operations

| Operation | Time(s.) (1024-bit) | Time(s.) (2048-bit) |
|---|---|---|
| Computation of r″ | 0.045 | 0.287 |
| Encryption | 0.045 | 0.287 |
| Decryption with r | 0.045 | 0.287 |
| Decryption with φ | 0.014 | 0.089 |
| Decryption with r″ | 0.000 | 0.001 |
| Constructing a TS | 3.01 | 19.32 |
| Verifying a TS | 3.00 | 19.30 |
| Proving $0 \leq x \leq 2^t$ given TS | 0.001 | 0.001 |
| Verifying proof of $0 \leq x \leq 2^t$ | 0.070 | 0.41 |

For a single item auction of k bidders, the auctioneer must produce k proofs of valid bids (i.e. $Bid_i < 2^t$ for small t; we use 34), and k−1 proofs of comparisons to prove the ordering of the outcome. Using the bulk verification method, such an auction requires 10·(2 k−1) test sets, plus 25% for the test sets that will be revealed to prove the test sets are valid. This gives us an upper bound of 25 k test sets required to conduct a trustworthy single-item auction.

For a multi-item auction with payments based on one bid (e.g. first-price or second-price), we need only add to the above k proofs $Qty_i < 2^t$, k comparisons $Qty_i < 1_{max}$, and 2 comparisons to prove Equation 7. This means we need about double the number of test sets, 4 k+1, to conduct such a multi-item auction; about 50 k test sets are needed for trustworthiness. We list the time taken to prepare these test sets and correctness proofs in Table 5.

TABLE 2

Time to prepare and verify auctions

| Operation | Number of Bids | | |
|---|---|---|---|
| | 100 | 1000 | 10000 |
| | Single-item Auctions | | |
| Preparation (1024-bit) | 2.1 hr | 21 hr | 8.7 days |
| Verification (1024-bit) | 25 min | 4.2 hr | 42 hr |
| Preparation (2048-bit) | 13.4 hr | 5.6 days | 56 days |
| Verification (2048-bit) | 2.7 hr | 27 hr | 11 days |
| | Multi-item Auctions | | |
| Preparation (1024-bit) | 4.2 hr | 42 hr | 17.5 days |
| Verification (1024-bit) | 52 min | 8.7 hr | 3.6 days |
| Preparation (2048-bit) | 27 hr | 11.2 days | 112 days |
| Verification (2048-bit) | 5.4 hr | 54 hr | 22 days |

For verified VCG payments in multi-item auctions, according to some aspects, we also use proofs of multiplications for at most 2 k+1 products, namely, ≦k proofs of the products $Qty_i \cdot Bid_i$ and k+1 proofs of the products of the partial allocation to the threshold bidder for the main economy $E(B)$ and up to k marginal economies $E(B_{-i})$. Each proof of a product requires 4 exponentiations for creating the MTS ("multiplication test set") and 6 exponentiations to verify it. To achieve a reasonably small probability of error, we repeat the multiplication proof 80 times $$\left(\frac{3^{80}}{4} \approx 10^{-10}\right).$$

Thus, in this example, each proof requires 320 exponentiations to create and 480 to verify. Table 3 shows time, again on a P4 2.8 GHz processor, to verify Vickrey payments in the worst case for various auction sizes.

TABLE 3

Verification of Vickrey payments

| Operation | Number of Bids | | |
|---|---|---|---|
| | 100 | 1000 | 10000 |
| Preparation (1024-bit) | 48 min | 8 hr | 3.3. days |
| Verification (1024-bit) | 72 min | 12 hr | 5 days |
| Preparation (2048-bit) | 5.1 hr | 51 hr | 21 days |
| Verification (2048-bit) | 7.7 hr | 77 hr | 32 days |

According to one embodiment of the invention, a method and system for providing a sealed bid auction comprises acts of an auctioneer posting one or more items to be auctioned, rules for conducting an auction for the items, and rules for determining the winner in the auction and the price to be paid for the items and rules for verification of the outcome of the auction. Each bidder provides a commitment to an encrypted bid. The auctioneer returns a receipt of the commitment. When a commitment is received, the auctioneer posts the commitment and all commitments are posted at or before a first time. At a second time, any bidder can appeal a bid not posted. Each bidder sends an encrypted bid corresponding to one commitment. At a third time, the auctioneer decrypts the bids and determines a winner and posts the winner's information. The auctioneer also posts proof of verification of the correctness of the auction outcome, where the proof of verification does not reveal any information about any bid that is not implied by the outcome of the auction.

According to one aspect of the method and system for providing a sealed bid auction, the act of posting rules for conducting the auction includes the establishment of a reserve price and publication of an encrypted form of the reserve price. At the third time, the auctioneer issues a statement that either the winning bid or bids were greater to or equal to the reserve price, or that all bids were less than the reserve price, and posts a proof of verification of the statement that reveals no additional information about any bid or the reserve price.

According to one aspect of the method and system for providing the sealed bid auction, the act of returning a receipt of the bid comprises returning a signed receipt of the bid.

According to one aspect of the method and system for providing the sealed bid auction, the bids are kept secret from the auctioneer until the third time.

According to one aspect of the method and system for providing the sealed bid auction, the act of sending an encrypted bid further comprises the bidder sending a random string with the bid.

According to one aspect of the method and system for providing the sealed bid auction, the bid is encrypted by a public encryption key and the corresponding decryption key is held by the auctioneer.

According to one aspect of the method and system for providing a sealed bid auction, the commitment by the bidder to further send the encrypted bid is done by applying a hash function to the encrypted bid and sending the resulting hash function value to the auctioneer.

According to one aspect of the method and system for providing the sealed bid auction, the commitment by the bidder to an encrypted bid is done by further encrypting the encrypted bid with a public key posted by a delayed private key revelation service and sending the resulting twice encrypted bid to the auctioneer.

According to one aspect of the method and system for providing a sealed bid auction, the act of unlocking the bid commitment further comprises posting the encrypted bids.

According to one aspect of the method and system for providing a sealed bid auction, the process further comprises posting the winner and payment information.

According to one aspect of the method and system for providing a sealed bid auction, the process further comprises the step of the auctioneer posting a verification proof for the outcome of the auction where said verification reveals nothing about values of bids.

According to one aspect of the method and system for providing a sealed bid auction, the process further comprises the auctioneer defining and posting the method that shall be used to prove correctness of the auction.

According to one aspect of the method and system for providing a sealed bid auction, the act of providing a commitment further comprises sending said commitment to a notary.

Thus, we have disclosed a protocols for sealed-bid auctions that guarantees trust and preserves a high level of secrecy, yet is practical enough to run efficiently on commodity hardware and be accepted in the business community by description of various aspects of the invention. Because we focus on proofs of correctness and secrecy during the auction, an auctioneer can still compute optimal results efficiently and publish efficiently verifiable proofs of those results. Our protocol rests on sound cryptographic foundations, and lends itself to straightforward extensions to further types of auctions, including support for all-or-nothing bids, bid curves, and full combinatorial auctions. It is to be appreciated that our practical test-set process and system will extend to other areas of privacy, including electronic transactions, trading systems, privacy-preserving open outcry markets, and zero-knowledge public verification of private data.

As discussed above, various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate an verifiably correct auction according to various embodiments of the invention. Further, the system may be located on a single computer or may be distributed among a plurality of computers attached by a communications network.

A general-purpose computer system according to one embodiment of the invention is configured to perform any of the described functions, including but not limited to publishing information relating to a verifiably correct auction, encrypting bid information, decrypting bid information, determining an outcome to the auction, and generating proof information. It should be appreciated, however, that the system may perform other functions, including performing financial transactions related to the auction, i.e. receiving payments from customers, providing indications to bidders regarding the status of the verifiably correct auction, etc., and the invention is not limited to having any particular function or set of functions.

Figure 3:
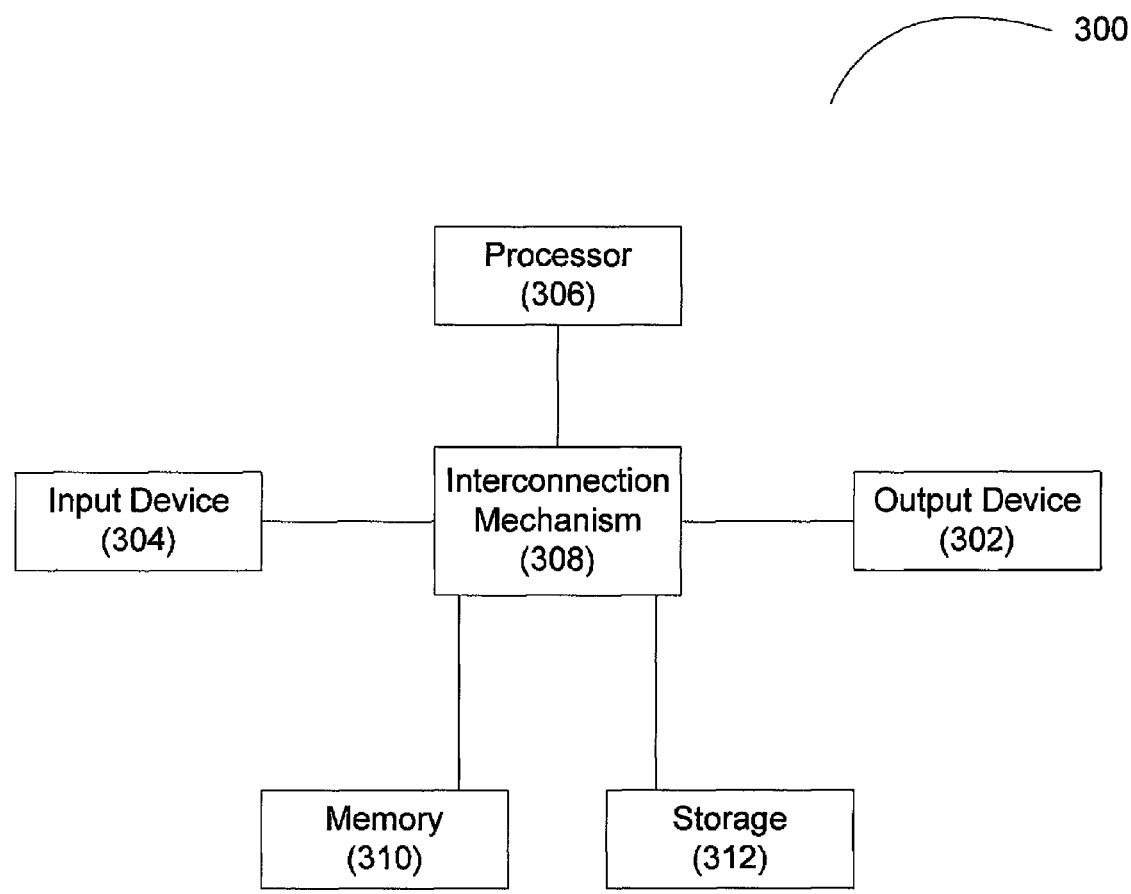
FIG. 3 is a block diagram of a system for conducting a verifiably correct auction according to one embodiment of the present invention.

FIG. 3 shows a block diagram of a general purpose computer system 300 in which various aspects of the present invention may be practiced. For example, various aspects of the invention may be implemented as specialized software executing in one or more computer systems including general-purpose computer systems 504, 506, and 508 communicating over network 502 shown in FIG. 5. Computer system 300 may include a processor 306 connected to one or more memory devices 310, such as a disk drive, memory, or other device for storing data. Memory 310 is typically used for storing programs and data during operation of the computer system 300. Components of computer system 300 may be coupled by an interconnection mechanism 308, which may include one or more busses (e.g., between components that are integrated within a same machine) and/or a network (e.g., between components that reside on separate discrete machines). The interconnection mechanism enables communications (e.g., data, instructions) to be exchanged between system components of system 300.

Computer system 300 may also include one or more input/output (I/O) devices 304, for example, a keyboard, mouse, trackball, microphone, touch screen, a printing device, display screen, speaker, etc. Storage 312, typically includes a computer readable and writeable nonvolatile recording medium in which signals are stored that define a program to be executed by the processor or information stored on or in the medium to be processed by the program.

Figure 4:
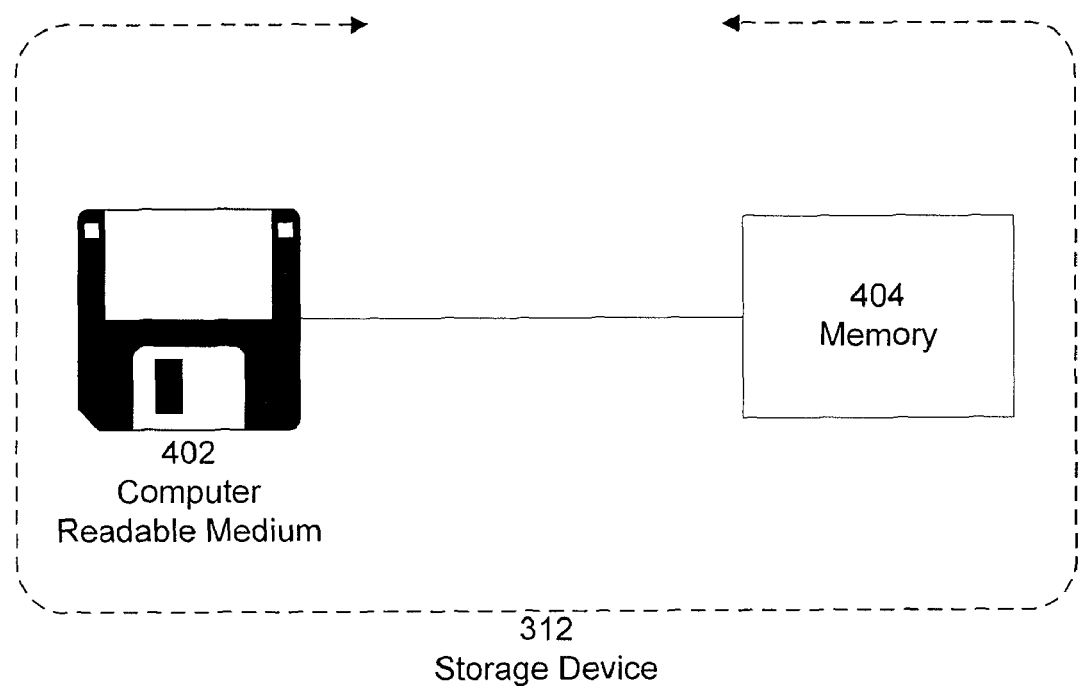
FIG. 4 is a block diagram of a system for conducting a verifiably correct auction according to one embodiment of the invention.

The medium may, for example, be a disk 402 or flash memory as shown in FIG. 4. Typically, in operation, the processor causes data to be read from the nonvolatile recording medium into another memory 404 that allows for faster access to the information by the processor than does the medium. This memory is typically a volatile, random access memory such as a dynamic random access memory (DRAM) or static memory (SRAM).

Referring again to FIG. 3, the memory may be located in storage 312 as shown, or in memory system 310. The processor 306 generally manipulates the data within the memory 310, and then copies the data to the medium associated with storage 312 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 300 is shown by way of example as one type of computer system upon which various aspects of the invention may be practiced, it should be appreciated that aspects of the invention are not limited to being implemented on the computer system as shown in FIG. 3. Various aspects of the invention may be practiced on one or more computers having a different architectures or components that that shown in FIG. 3.

Computer system 300 may be a general-purpose computer system that is programmable using a high-level computer programming language. Computer system 300 may be also implemented using specially programmed, special purpose hardware. In computer system 300, processor 306 is typically a commercially available processor such as the well-known Pentium class processor available from the Intel Corporation. Many other processors are available. Such a processor usually executes an operating system which may be, for example, the Windows-based operating systems (e.g., Windows Vista, Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this system can be implemented by one or more systems similar to system 300. For instance, the system may be a distributed system (e.g., client server, multi-tier system) comprising multiple general-purpose computer systems. In one example, the system includes software processes executing on a system associated with a bidder (e.g., a client computer system). These systems may permit the bidder to access auctions, submit encrypted bid information, generate bid commitments, among others. There may be other computer systems, such as those installed at a auction operator's location that perform functions such as receiving encrypted bid information, posting encrypted bid information, decrypting encrypted bid information to determine the outcome of an auction, posting proof information for verifying the outcome of the auction, among other functions. As discussed, these systems may be distributed among a communication system such as the Internet. One such distributed network, as discussed below with respect to FIG. 5, may be used to implement various aspects of the present invention.

Figure 5:
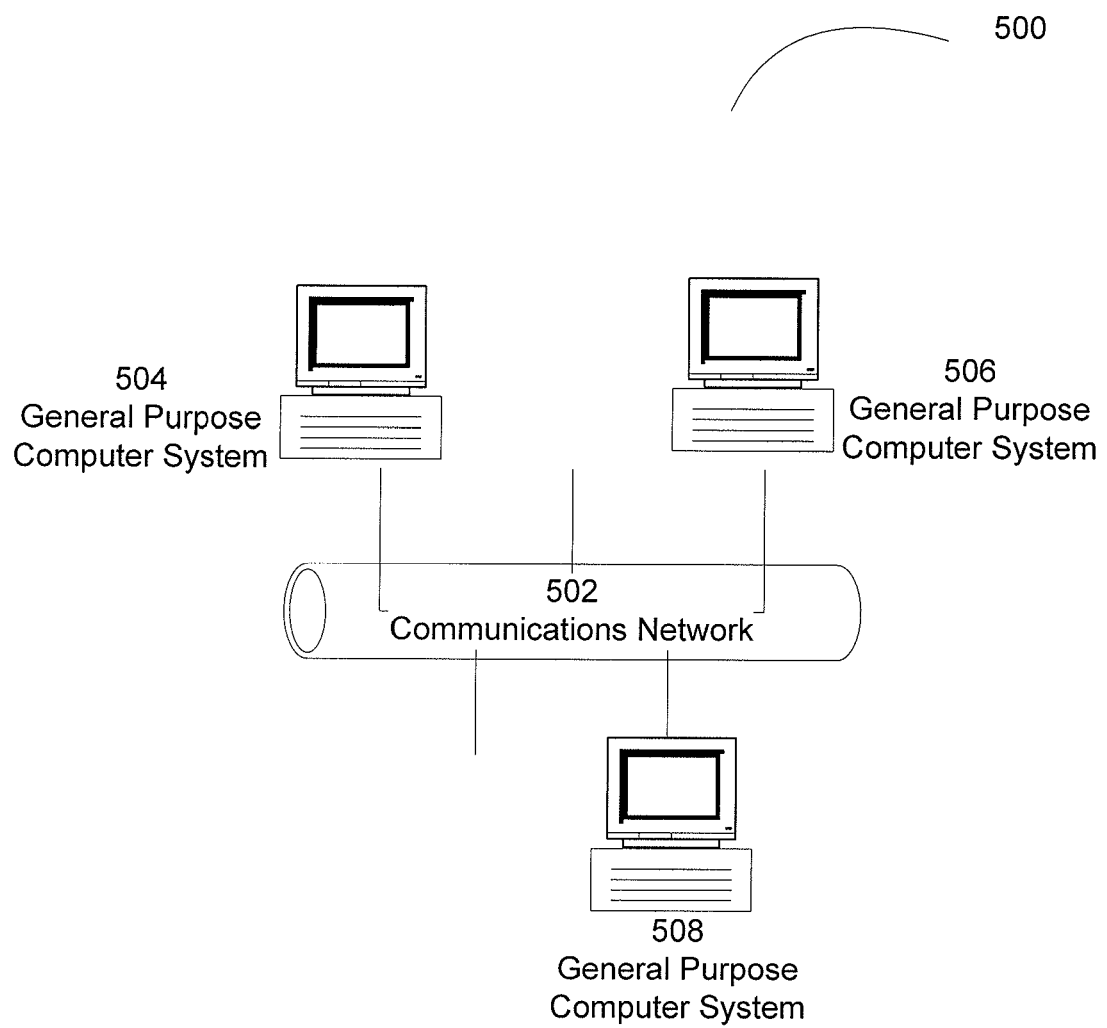
FIG. 5 is a block diagram of a system for conducting a verifiably correct auction according to one embodiment of the invention.

FIG. 5 shows an architecture diagram of an example distributed system 500 suitable for implementing various aspects of the present invention. It should be appreciated that FIG. 5 is used for illustration purposes only, and that other architectures may be used to facilitate one or more aspects of the present invention.

System 500 may include one or more general-purpose computer systems distributed among a network 502 such as, for example, the internet. Such systems may cooperate to perform functions related to the verifiably correct auction. In an example of one such system for conducting a verifiably correct auction, one or more bidders operate one or more client computer systems 504, 506, and 508 through which encrypted bid information is submitted for use in the verifiably correct auction. In one example, bidders interface with the system via an internet-based interface.

In one example, a system 504 includes a browser program such as the Microsoft Internet Explorer application program through which one or more websites may be accessed. Further, there may be one or more application programs that are executed on system 504 that perform functions associated with the verifiably correct auction. System 504 may include one or more local databases including, but not limited to, information relating to a current auction that is underway for a particular item or items.

Network 502 may also include, as part of the system for conducting a verifiably correct auction one or more server systems, which may be implemented on general purpose computers that cooperate to perform various functions of the system for conducting a verifiably correct auction including decryption, generation of proof information, and verification of auction outcomes, and other functions. System 500 may execute any number of software programs or processes and the invention is not limited to any particular type or number of processes. Such processes may perform the various workflows associated with the system for conducting a verifiably correct auction.

It should be appreciated that according to one aspect of the invention, the methods described may be performed as processes programmed to execute on one or more general purpose computers. The general purpose computers may be implemented in a client server system or any other type of distributed computer system. In one embodiment, certain steps may be executed exclusively on a server computer system, with other steps being exclusively executed on the client, or the steps may be performed in cooperation by the client and server systems. In one example, the server computer system may host a bulletin board that a bidder may access using a client computer system. In one example, the bidder using the client computer system accesses an encryption key. In another example the client computer system encrypts bid information using the encryption key. In another embodiment, the bidder will input the bid information into the client computer system and the server computer system actual performs the encryption. In yet another embodiment, the client server system may download the software necessary to encrypt bid information from the server system at the time it is needed. In one example, the download may be an independent software program, or the download may take the form of a java applet, or browser plug-in, amongst other options. In one embodiment, the bidder may use a client computer system to submit encrypted bid information. In another embodiment, the bidder submits the encrypted bid information through the server computer system. In one example, the server hosts a bulletin board, and the encrypted bid information in posted to the bulletin board. In another example, the bulletin board may take the form of a web page. In one embodiment, the server computer system allows the auction operator to decrypt encrypted bid information after the close of bidding. In another embodiment, the server computer system provides for the auction operator to generate proof information for the verifiably correct auction. In one example, the auction operator will use the server computer system to publish the generated proof information. It should be understood by one skilled in the art that each of the client computer system and the server computer system discussed may each also be implemented as a distributed computer system made up of multiple computers or components. In one example, the server computer system host a web page that also contains bid submission rules that require the auction operator to maintain the secrecy of bids. In another embodiment, the encrypted bid information includes a digitally signed bid commitment. In another example a client computer system is used to generate an encrypted bid using an encryption key and a help value. In one example, the help value is a random string generated on the client computer system. In one embodiment, the client computer system is used to generate a cryptographic commitment as part of the bid commitment. In another embodiment, the client computer system is used to generate a cryptographic commitment on a random string. In one example, a client computer is used to generate a bid commitment including an auction identifier. In another embodiment, the client computer is used to submitted a digitally signed bid commitment before the close of the auction and to submit the encrypted bid after the close of bidding. In one example, the client computer is used to generate a cryptographic commitment using a cryptographic hash function. In another example, the cryptographic hash function is hosted on the server computer system and the client computer accesses it on the server computer system. In another embodiment, a witness service may be implemented on another server or client computer system. In one example, a bidder used a client computer system to submit encrypted bid information to the witness. In another example, the witness receives the encrypted bid information using a client computer system or a server computer system. In one embodiment, the witness uses either a client or server computer system to submit encrypted bid information. In another embodiment, the client computer system generates an encrypted bid using an encrypted key provided by the auction operator and a help value, and encrypts the result with an encryption key from an encryption key revelation service. In yet another embodiment, a bidder uses a client computer system to access a server computer system that generates an encrypted bid using an encrypted key provided by the auction operator and a help value, and encrypts the result with an encryption key from an encryption key revelation service. In one example, the server computer system is used to generate an intermediate outcome, which is used as an intermediate step in determining a final result of the auction. In another example, the server computer system permits an auction operator to decrypt encrypted bid information using an decryption key known only to the auction operator. In one embodiment, the server computer system prevents the auction operator from learning information contained in a bid prior to the close of bidding.

In another aspect of the invention, the preceding embodiments and examples may also be implemented on computer-readable medium having computer-readable signals stored thereon that define instructions that, as a result of being executed by a computer, instruct the computer to perform a the methods and example discussed. The computer-readable medium may be used in conjunction with a client computer systems and/or server computer systems, and may optionally be used in conjunction with other distributed computing systems.

In another aspect of the invention, a computer system for conducting a verifiably correct auction may comprise one or more general purpose computer systems with components installed or hardware configured to operate in a distributed computer system. In one embodiment, a communication component resides on a client computer system that communicates information related to the auction. In one example the information includes an encryption key, encrypted bid information, and proof information for verifying the outcome of the auction. In another embodiment, the communication component resides on a server computer system. In yet another embodiment, the communication component resides in part on a client computer system and in part on a server computer system. In one example, a client computer system includes an encryption component that generates encrypted bid information. In another example, the client computer system downloads the encryption component as executable software from a server computer system. In a further example, the server computer system hosts the encryption component for access by client computer systems. In one embodiment, a server computer system uses a proof component to generate proof information for verifying the outcome of the auction. In another embodiment, the server computer system may work in conjunction with a client computer to generate the proof information. In one example, a verification component resides on the server computer system that verifies the outcome of the auction based on encrypted bid information and the proof information. In another embodiment, the verification component resides on the client computer system. In yet another embodiment, the verification component is implemented in part on the client computer system and in part on the server computer system, with both parts performing functions that permit the verification of the outcome of the auction.

The invention claimed is:

1. A computer implemented method for conducting a verifiably correct auction, the method comprising the acts of:
   publishing, by an auction server, an encryption key for encrypting bid information;
   generating a computer interface for a bidder to submit encrypted bid information;
   receiving the encrypted bid information from a plurality of bidders over a communication network connected to the auction server, wherein the encrypted bid information includes a bid commitment for an encrypted bid, wherein the encrypted bid includes a bid amount encrypted using the published key;
   publishing the received bid commitment;
   closing the auction by the auction server wherein the act of closing includes:
      accessing, by the auction server, encrypted bids after bidding has closed, wherein the act of accessing includes at least one of:
         decrypting the encrypted bid information to obtain an encrypted bid, and
         receiving, by the auction server, the encrypted bid corresponding to the bid commitment,
      wherein closing the auction includes an act of determining, by the auction server, a winning bid according to the bid amount for each received encrypted bid;
   ordering the encrypted bids by a respective bid amount, wherein the ordering of encrypted bids identifies a winning encrypted bid without revealing the respective bid amounts;
   generating proof information by the auction server for verifying the ordering of the encrypted bids,
   publishing the proof information verifying the ordering of the encrypted bids, wherein publishing the proof information includes an act of publishing values used to generate a portion of the proof information.

2. The method according to claim 1, further comprising providing bid submission rules that require the auction operator to maintain secrecy of bids.

3. The method according to claim 1, wherein the bid commitment includes a digital signature and the method further comprises an act of publishing a respective encrypted bid used to generate the digitally signed bid commitment.

4. The method according to claim 3,
   wherein the bid commitment includes a cryptographic commitment for an encrypted bid, wherein the cryptographic commitment for the encrypted bid is generated using at least the published encryption key and a help value.

5. The method according to claim 3, wherein the bid commitment further comprises at least one of a cryptographic commitment, a cryptographic commitment generated from a random string, and an auction identifier.

6. The method according to claim 4, further comprising the acts of:
   receiving the digitally signed bid commitment before the close of bidding; and
   receiving the encrypted bid after the close of bidding.

7. The method of claim 4, wherein the cryptographic commitment is generated using at least a cryptographic hash function.

8. The method according to claim 1, the method further comprising an act of providing for the bidder to submit the encrypted bid information to a witness.

9. The method according to claim 8, further comprising an act of permitting the witness to submit the encrypted bid information.

10. The method according to claim 1, further comprising an act of providing for the bidder to submit the encrypted bid information to a bulletin board.

11. The method according to claim 10, wherein the bulletin board includes a web page.

12. The method according to claim 1, further comprising the acts of:
    providing an additional encryption key through an encryption key revelation service;
    providing for the bidder to generate an encrypted bid using the encryption key and a help value; and
    providing for the bidder to encrypt the encrypted bid using the additional encryption key.

13. The method according to claim 12, wherein the act of providing for the bidder to encrypt the encrypted bid using the additional encryption key includes an act of chain-encrypting the encrypted bid information.

14. The method according to claim 12, further comprising an act of generating the additional encryption key from distributed data.

15. The method according to claim 1, wherein the outcome of the auction comprises an intermediate step in determining a final result of the auction.

16. The method according to claim 1, further comprising the act of permitting anyone to verify the outcome of the auction based on the ordering of encrypted bids and the proof information.

17. The method according to claim 1, further comprising the act of preventing the auction operator from learning information contained in a bid prior to close of bidding.

18. The method according to claim 1, further comprising an act of permitting the auction operator to decrypt the encrypted bid information after the close of bidding, wherein the act of permitting the auction operator to decrypt the encrypted bid information includes an act of using a decryption key known only to the auction operator.

19. A system for conducting a verifiably correct auction, the system comprising:
    at least one processor operatively connected to a memory containing instructions when executed cause the system to perform acts of:
    publishing an encryption key for encrypting bid information;
    generating a computer interface for a bidder to submit encrypted bid information;
    receiving encrypted bid information from a plurality of bidders over a communication network connected to the auction server, wherein the encrypted bid information includes a bid commitment for an encrypted bid, wherein the encrypted bid includes a bid amount encrypted using the published key;
    publishing the received bid commitment;
    closing the auction wherein the act of closing includes:
       accessing encrypted bids after bidding has closed, wherein the act of accessing includes at least one of:
          decrypting the encrypted bid information to obtain an encrypted bid, and
          receiving the encrypted bid corresponding to the bid commitment, wherein closing the auction includes an act of determining a winning bid according to the bid amount for each received encrypted bid;

ordering the encrypted bids by a respective bid amount, wherein the ordering of encrypted bids identifies a winning encrypted bid without revealing the respective bid amounts;

generating proof information for verifying the ordering of the encrypted bids, publishing the proof information verifying the ordering of the encrypted bids is correct, wherein the act of publishing the proof information includes an act of publishing values used to generate a portion of the proof information.

20. A computer-readable storage medium having computer-readable instructions that, as a result of being executed by a computer, instruct the computer to perform a method for conducting a verifiably correct auction, the method comprising the acts of:

publishing an encryption key for encrypting bid information;

generating a computer interface for a bidder to submit encrypted bid information;

receiving the encrypted bid information from a plurality of bidders over a communication network connected to the auction server, wherein the encrypted bid information includes a bid commitment for an encrypted bid, wherein the encrypted bid includes a bid amount encrypted using the published key;

publishing the received bid commitment;

closing the auction wherein the act of closing includes:
  accessing encrypted bids after bidding has closed, wherein the act of accessing includes at least one of:
    decrypting the encrypted bid information to obtain an encrypted bid, and
    receiving the encrypted bid corresponding to the bid commitment,
  wherein closing the auction includes an act of determining a winning bid according to the bid amount for each received encrypted bid;

ordering the encrypted bids by a respective bid amount, wherein the ordering of encrypted bids identifies a winning encrypted bid without revealing the respective bid amounts;

generating proof information for verifying the ordering of the encrypted bids, publishing the proof information verifying the ordering of the encrypted bids, wherein publishing the proof information includes an act of publishing values used to generate a portion of the proof information.

* * * * *